United States Patent
Lee et al.

(10) Patent No.: US 12,368,878 B2
(45) Date of Patent: *Jul. 22, 2025

(54) IMAGE ENCODING/DECODING METHOD AND DEVICE, AND RECORDING MEDIUM IN WHICH BITSTREAM IS STORED

(71) Applicant: INTELLECTUAL DISCOVERY CO., LTD., Seoul (KR)

(72) Inventors: Ha Hyun Lee, Seoul (KR); Sung Chang Lim, Daejeon (KR); Jung Won Kang, Daejeon (KR); Jin Ho Lee, Daejeon (KR); Hui Yong Kim, Daejeon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,259

(22) Filed: Apr. 19, 2024

(65) Prior Publication Data

US 2024/0283964 A1    Aug. 22, 2024

Related U.S. Application Data

(63) Continuation of application No. 18/092,066, filed on Dec. 30, 2022, now Pat. No. 11,997,304, which is a
(Continued)

(30) Foreign Application Priority Data

Mar. 30, 2018  (KR) .......... 10-2018-0037265
Apr. 16, 2018  (KR) .......... 10-2018-0043725
(Continued)

(51) Int. Cl.
*H04N 19/513*   (2014.01)
*H04N 19/56*    (2014.01)
*H04N 19/91*    (2014.01)

(52) U.S. Cl.
CPC .......... *H04N 19/513* (2014.11); *H04N 19/56* (2014.11); *H04N 19/91* (2014.11)

(58) Field of Classification Search
CPC ....... H04N 19/513; H04N 19/56; H04N 19/91
See application file for complete search history.

(56) References Cited

U.S. PATENT DOCUMENTS 9,635,380 B2    4/2017  Kim et al.
10,958,927 B2 * 3/2021  Li ......................... H04N 19/56
(Continued)

FOREIGN PATENT DOCUMENTS

CN    102668562 A    9/2012
CN    107431820 A    12/2017
(Continued)

*Primary Examiner* — Jeremiah C Hallenbeck-Huber
(74) *Attorney, Agent, or Firm* — BROADVIEW IP LAW, PC

(57) ABSTRACT

The present invention is about an image encoding/decoding method and apparatus. According to present invention, a method of decoding an image, the method comprising, deriving an initial motion vector of a current block; deriving a refined motion vector by using the initial motion vector, and generating a prediction block of the current block by using the refined motion vector.

10 Claims, 26 Drawing Sheets

Related U.S. Application Data continuation of application No. 17/043,575, filed as application No. PCT/KR2019/003642 on Mar. 28, 2019, now Pat. No. 11,575,925.

(30) Foreign Application Priority Data

| | | |
|---|---|---|
| Jun. 29, 2018 | (KR) | ........................ 10-2018-0075704 |
| Jul. 17, 2018 | (KR) | ........................ 10-2018-0082688 |
| Sep. 20, 2018 | (KR) | ........................ 10-2018-0112714 |
| Mar. 8, 2019 | (KR) | ........................ 10-2019-0026774 |

(56) References Cited

U.S. PATENT DOCUMENTS

| | | | |
|---|---|---|---|
| 2011/0176611 A1* | 7/2011 | Huang ................ | H04N 19/46 |
| | | | 375/E7.123 |
| 2016/0286230 A1* | 9/2016 | Li ...................... | H04N 19/176 |
| 2016/0373688 A1 | 12/2016 | Imajo et al. | |
| 2017/0085906 A1 | 3/2017 | Chen et al. | |
| 2017/0310990 A1 | 10/2017 | Hsu | |
| 2018/0070092 A1 | 3/2018 | Kim et al. | |
| 2018/0192071 A1* | 7/2018 | Chuang ............... | H04N 19/527 |
| 2018/0242004 A1 | 8/2018 | Park et al. | |
| 2018/0352247 A1* | 12/2018 | Park .................... | H04N 19/513 |
| 2019/0208223 A1 | 7/2019 | Galpin et al. | |
| 2019/0342557 A1 | 11/2019 | Robert et al. | |
| 2019/0364284 A1* | 11/2019 | Moon ................. | H04N 19/513 |
| 2020/0128250 A1* | 4/2020 | Lee .................... | H04N 19/159 |
| 2020/0128258 A1* | 4/2020 | Chen ................... | H04N 19/139 |
| 2020/0162743 A1 | 5/2020 | Park et al. | |

FOREIGN PATENT DOCUMENTS

| | | |
|---|---|---|
| KR | 100772576 B1 | 11/2007 |
| KR | 1020120096471 A | 8/2012 |
| KR | 1020140092876 A | 7/2014 |
| KR | 1020140095607 A | 8/2014 |
| KR | 1020170059718 A | 5/2017 |
| KR | 1020170116879 A | 10/2017 |
| KR | 1020170121383 A | 11/2017 |
| KR | 1020180005121 A | 1/2018 |
| WO | 0186962 A1 | 11/2001 |
| WO | 2011047994 | 4/2011 |
| WO | 2013070757 A1 | 5/2013 |

* cited by examiner

FIG. 11

| Merge candidate Index (merger_idx) | L0 motion information | | L1 motion information | |
|---|---|---|---|---|
| | Motion vector | Reference picture index | Motion vector | Reference picture index |
| 0 | (3,1) | 0 | (-2,0) | 0 |
| 1 | (-1,5) | 1 | (-3,0) | 0 |
| 2 | (3,1) | 0 | - | - |
| 3 | (3,1) | 0 | (-3,0) | 0 |
| 4 | (6,2) | 0 | - | - |

FIG. 12

| Initial L0 motion vector list | |
|---|---|
| Motion vector | Reference picture index |
| (3,1) | 0 |
| (-1,5) | 1 |
| (6,2) | 0 |

| Initial L1 motion vector list | |
|---|---|
| Motion vector | Reference picture index |
| (-2,0) | 0 |
| (-3,0) | 0 |

| Merge candidate Index (merger_idx) | L0 motion information | | L1 motion information | |
|---|---|---|---|---|
| | Motion vector | Reference picture index | Motion vector | Reference picture index |
| 0 | (3,1) | 0 | (-2,0) | 0 |
| 1 | (-1,5) | 1 | (-3,0) | 0 |
| 2 | (-3,-1) | 0 | - | - |
| 3 | (3,1) | 0 | (-3,0) | 0 |
| 4 | (6,2) | 0 | - | - |

| Merge candidate Index (merger_idx) | L0 motion information | | L1 motion information | |
|---|---|---|---|---|
| | Motion vector | Reference picture index | Motion vector | Reference picture index |
| 0 | (3,1) | 0 | (-2,0) | 0 |
| 1 | (-1,5) | 1 | (-3,0) | 0 |
| 2 | (-3,-1) | 0 | - | - |
| 3 | (3,1) | 0 | (-3,0) | 0 |
| 4 | (6,2) | 0 | - | - |

| Merge candidate Index (merger_idx) | L0 motion information | | L1 motion information | |
|---|---|---|---|---|
| | Motion vector | Reference picture index | Motion vector | Reference picture index |
| 0 | (3,1) | 0 | - | - |
| 1 | (-1,5) | 1 | - | - |
| 2 | (-3,-1) | 0 | - | - |
| 3 | (3,1) | 0 | (-3,0) | 0 |
| 4 | (6,2) | 0 | - | - |

Positions of neighboring sub-blocks that can be used as sub-block initial motion vectors

IMAGE ENCODING/DECODING METHOD AND DEVICE, AND RECORDING MEDIUM IN WHICH BITSTREAM IS STORED

CROSS-REFERENCE TO RELATED APPLICATIONS

This application is a continuation of U.S. application Ser. No. 18/092,066, filed on Dec. 30, 2022, which is a continuation of U.S. application Ser. No. 17/043,575, filed on Sep. 29, 2020, granted U.S. Pat. No. 11,575,925, issued on Feb. 7, 2023, which is a National Stage Entry of PCT International Application No. PCT/KR2019/003642, filed on Mar. 28, 2019, which claims priority to Korean Patent Application No. 10-2019-0026774, filed on Mar. 8, 2019, Korean Patent Application No. 10-2018-0112714, filed on Sep. 20, 2018, Korean Patent Application No. 10-2018-0082688, filed on Jul. 17, 2018, Korean Patent Application No. 10-2018-0075704, filed on Jun. 29, 2018, Korean Patent Application No. 10-2018-0043725, filed on Apr. 16, 2018, and Korean Patent Application No. 10-2018-0037265, filed on Mar. 30, 2018, the entire contents of which are hereby incorporated by references in its entirety.

TECHNICAL FIELD

The present invention relates to an image encoding/decoding method, an image encoding/decoding apparatus, and a recording medium in which a bitstream is stored. Specifically, the present invention relates to an image encoding/decoding method and apparatus using a motion vector refinement technique.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide an image encoding/decoding method and apparatus capable of improving compression efficiency, and a recording medium storing a bitstream generated by the image encoding method or apparatus.

Another object of the present invention is to provide a motion vector refinement method and apparatus for improving compression efficiency of inter prediction and a recording medium storing a bitstream generated by the method or apparatus.

A further object of the present invention is to provide an inter prediction method and apparatus capable of reducing computational complexity and a recording medium storing a bit stream generated by the method or apparatus.

Technical Solution

A method of decoding an image of the present invention may comprise, deriving an initial motion vector of a current block; deriving a refined motion vector by using the initial motion vector; and generating a prediction block of the current block by using the refined motion vector.

In the method of decoding an image of the present invention, the initial motion vector comprises an initial L0 motion vector and an initial L1 motion vector, the refined motion vector comprises a refined L0 motion vector and a refined L1 motion vector, and the refined motion vector is derived by using a merge mode-based motion vector refinement method or a prediction block-based motion vector refinement method.

In the method of decoding an image of the present invention, when the refined motion vector is derived by the merge mode-based motion vector refinement method, the image decoding method further comprises entropy-decoding information indicating an initial motion vector to be used in the merge mode-based motion vector refinement method.

In the method of decoding an image of the present invention, further comprising entropy-decoding magnitude information and direction information of the refined motion vector.

In the method of decoding an image of the present invention, further comprising entropy-decoding magnitude unit information of the refined motion vector, wherein a magnitude unit of the refined motion vector refers to an integer pixel or a sub-pixel.

In the method of decoding an image of the present invention, the refined L0 motion vector is derived by adding a difference between the L0 initial motion vector and an L0 motion vector that has moved within a predetermined search area to the L0 initial motion vector.

In the method of decoding an image of the present invention, the refined L1 motion vector is derived by adding a difference between the L1 initial motion vector and an L1 motion vector moved within a predetermined search are to the L1 initial motion vector.

In the method of decoding an image of the present invention, when a POC difference between an L0 reference picture of the current block and a decoding target picture including the current block and a POC difference value between an L1 reference picture and the decoding target picture including the current block are all negative vales, and the refined L0 motion vector is derived by adding a difference between the L1 initial motion vector and an L1 motion vector that has moved within a predetermined search area to the L0 initial motion vector.

In the method of decoding an image of the present invention, when only one of a POC difference between the L0 reference picture of the current block and a decoding target picture including the current block and a POC difference between the L1 reference picture and the decoding target picture including the current block has a negative value, the refined L0 motion vector is derived by mirroring a difference between the L1 initial motion vector and an L1 motion vector that has moved within a predetermined search area and adding the mirrored difference to the L0 initial motion vector.

In the method of decoding an image of the present invention, when a POC difference between the L0 reference picture of the current block and a decoding target picture including the current block and a POC difference between the L1 reference picture and the decoding target picture including the current block are different from each other, the refined L0 motion vector is derived by scaling a difference between the L1 initial motion vector and an L1 motion vector that has moved within a predetermined search area and adding the scaled difference to the initial L0 motion vector.

In the method of decoding an image of the present invention, when a POC difference between the L0 reference picture of the current block and a decoding target picture including the current block and a POC difference between the L1 reference picture and the decoding target picture including the current block are different from each other, the refined L1 motion vector is derived by scaling a difference between the L0 initial motion vector and a L0 motion vector that has moved within a predetermined search area and adding the scaled difference to the initial L1 motion vector.

In the method of decoding an image of the present invention, when the refined motion vector is derived by the prediction block-based motion vector refinement method, the image decoding method further comprises entropy-decoding information indicating whether the prediction block-based motion vector refinement method is usable.

In the method of decoding an image of the present invention, the prediction block-based motion vector refinement method is performed only when the current block has a bi-direction prediction merge mode.

In the method of decoding an image of the present invention, the prediction block-based motion vector refinement method is performed only when a POC difference between the L0 reference picture of the current block and a decoding target picture including the current block is equal to a POC difference between the L1 reference picture of the current block and the decoding target picture including the current block.

In the method of decoding an image of the present invention, the prediction block-based motion vector refinement method is performed only when a vertical size of the current block is 8 or more and an area of the current block is 64 or more.

In the method of decoding an image of the present invention, the prediction block is located within a predetermined search area that falls within a predetermined distance from a pixel position indicated by the initial motion vector, and the predetermined search area is set on a per integer pixel basis and ranges from −2 pixel positions to 2 pixel positions with respect to the pixel position indicated by the initial motion vector in both of a horizontal direction and a vertical direction.

In the method of decoding an image of the present invention, when the current block has a vertical or horizontal size greater than 16, the current block is divided into 16×16 sub-blocks and the prediction block-based motion vector refinement method is performed by using prediction blocks on a per sub-block basis.

In the method of decoding an image of the present invention, the refined L0 motion vector is derived from a distortion value between a prediction block that is generated by using a motion vector that has moved within a predetermined search area centered at a pixel position that is present within the L0 reference picture and indicated by the L0 initial motion vector, and a prediction block generated by using a motion vector that has moved within the predetermined search area centered at a pixel position that is present within the L1 reference picture and indicated by the L1 initial motion vector.

In the method of decoding an image of the present invention, the distortion value is calculated by one or more operations selected from among sum of absolute difference (SAD), sum of absolute transformed difference (SATD), sum of squared error (SSE), and mean of squared error (MSE)

In the method of encoding an image of the present invention may comprises deriving an initial motion vector of a current block; deriving a refined motion vector by using the initial motion vector, and entropy-encoding motion compensation information of the current block using the refined motion vector.

In the non-temporary storage medium of the present invention, including a bitstream, generated by an image encoding method comprising deriving an initial motion vector of a current block; deriving a refined motion vector by using the initial motion vector; and entropy-encoding motion compensation information of the current block using the refined motion vector.

Advantageous Effects

According to the present invention, it is possible to provide an image encoding/decoding method and apparatus capable of improving efficiency of image compression and a recording medium storing a bit stream generated by the image encoding/decoding method or apparatus.

According to the present invention, it is possible to provide a motion vector refinement method and apparatus for improving compression efficiency through inter prediction and a recording medium storing a bitstream generated by the method or apparatus.

According to the present invention, it is possible to provide an inter prediction method and apparatus capable of reducing computational complexity and a recording medium storing a bitstream generated by the method or apparatus.

DESCRIPTION OF DRAWINGS

FIGS. 11 and 12 are diagrams illustrating a method of constructing an initial motion vector list;

FIG. 34 is a diagram illustrating a search area range in which a refined motion vector is searched for;

MODE FOR INVENTION

Figure 1:
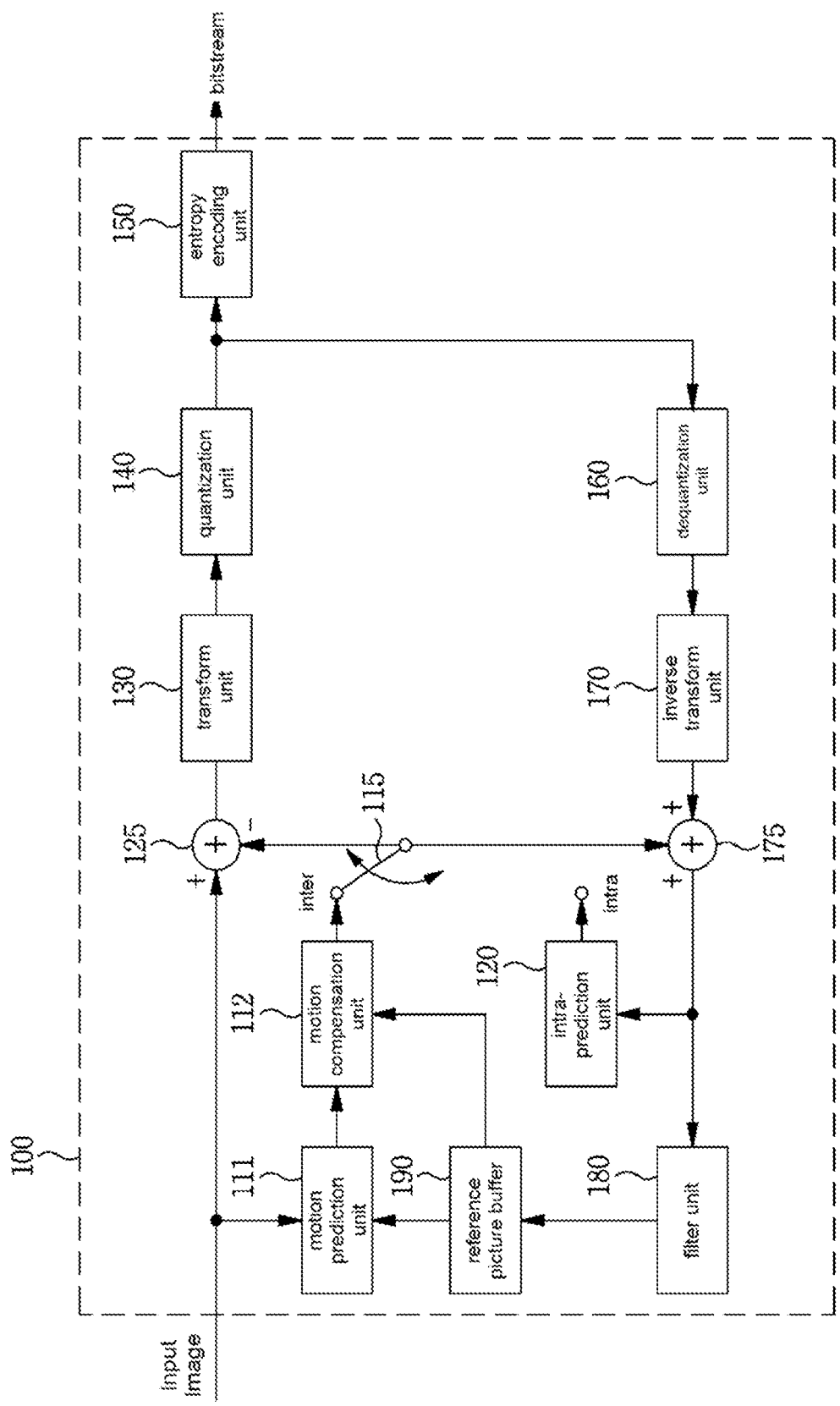
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself.

For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel.

That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method, a ternary-tree partitioning method, etc. to configure a lower unit such as coding unit, prediction unit, transform unit, etc. It may be used as a term for designating a sample block that becomes a process unit when encoding/decoding an image as an input image. Here, a quad-tree may mean a quaternary-tree.

When the size of a coding block falls within a first predetermined range, only quad-tree partitioning is allowed for the coding block. Here, the first predetermined range may be defined by at least one of a maximum size and a minimum size of a coding block that can be partitioned only by quad-tree partitioning. Information indicating the maximum/minimum size of the coding block for which quad-tree partitioning is allowed may be signaled as data included in a bitstream, and the information may be signaled in units of at least one of a sequence, a picture parameter, a tile group, and a slice (segment). Alternatively, the maximum/minimum size of the coding block may be a fixed size preset in the encoder/decoder. For example, when the size of the coding block is within a range from 64×64 to 256×256, the coding block can be partitioned only by quad-tree partitioning. Alternatively, when the size of the coding block is larger than the maximum size of a transform block (TB), the coding block can be partitioned only by quad-tree partitioning. In this case, the block to be partitioned into quadrants may be either a coding block or a transform block. In this case, information (for example, split_flag) indicating the quad-tree partitioning of a coding block may be a flag indicating whether or not the coding unit is partitioned by quad-tree partitioning. When the size of a coding block falls within a second predetermined range, the coding block can be partitioned only by binary-tree partitioning or ternary-tree partitioning. In this case, the above description of quad-tree partitioning can also be applied to binary-tree partitioning or ternary-tree partitioning.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a tile group, a slice header, and tile header information. In addition, the tile group may mean a group including a plurality of tiles and may have the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may mean a list including one or more reference pictures used for inter-picture prediction or motion compensation. LC (List Combined), L0 (List 0), L1 (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Prediction list utilization flag: may represent whether a prediction block is generated using at least one reference image included in a specific reference picture list. An inter prediction indicator may be derived using a prediction list utilization flag, and reversely, a prediction list utilization flag may be derived using an inter prediction indicator. For example, when a prediction list utilization flag indicates a first value of "0", it represents a prediction block is not generated using a reference picture included in the corresponding reference picture list. When a prediction list utilization flag indicates a second value of "1", it represents a prediction block is generated using a reference picture included in the corresponding reference picture list.

Reference Picture Index: may mean an index indicating a specific reference picture in a reference picture list.

Reference Picture: may mean a picture to which a specific block refers for inter-picture prediction or motion compensation. Alternatively, a reference picture may be a picture including a reference block referred to by a current block for inter prediction or motion compensation. Hereinafter, the term "reference picture" and "reference image" may be used as the same meaning and used interchangeably.

Motion Vector: is a two-dimensional vector used for inter-picture prediction or motion compensation and may mean an offset between a reference picture and an encoding/decoding target picture. For example, (mvX, mvY) may represent a motion vector, mvX may represent a horizontal component, and mvY may represent a vertical component.

Search Range: may be a 2-dimensional region where search for a motion vector during inter prediction is performed. For example, a size of a search range may be M×N. M and N may be a positive integer, respectively.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list configured using one or more motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: may mean a list composed of merge candidates.

Merge Candidate: may mean a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: may mean an indicator indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether to partition of a ternary-tree form, a partition direction of a ternary-tree form (horizontal direction or vertical direction), a partition form of a ternary-tree form (symmetric partition or asymmetric partition), whether to partition of a multi-type-tree form, a partition direction of a multi-type-tree form (horizontal direction or vertical direction), a partition form of a multi-type-tree form (symmetric partition or asymmetric partition), a partitioning tree of multi-type-tree form, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile group identification information, a tile group type, tile group partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
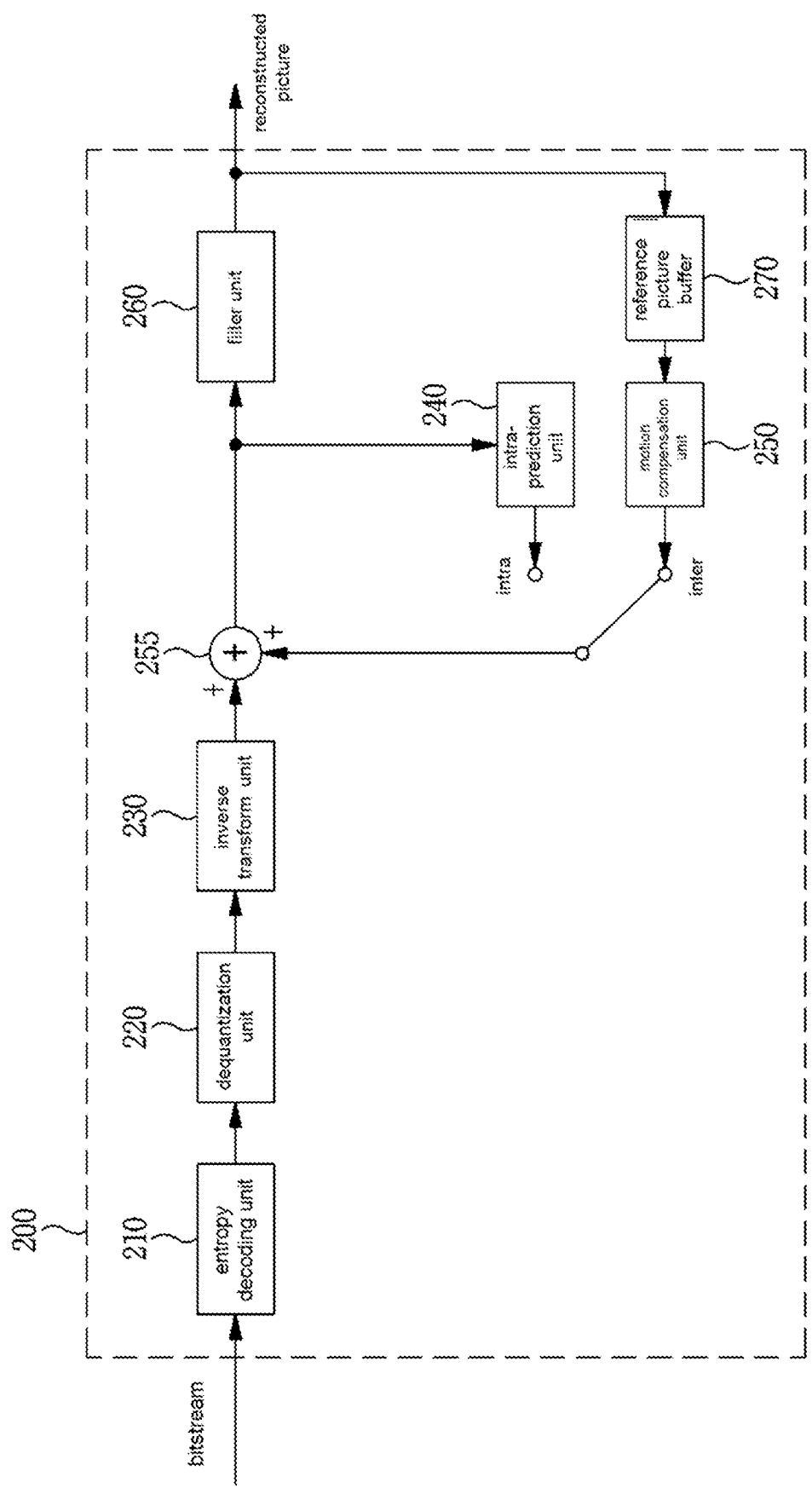
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
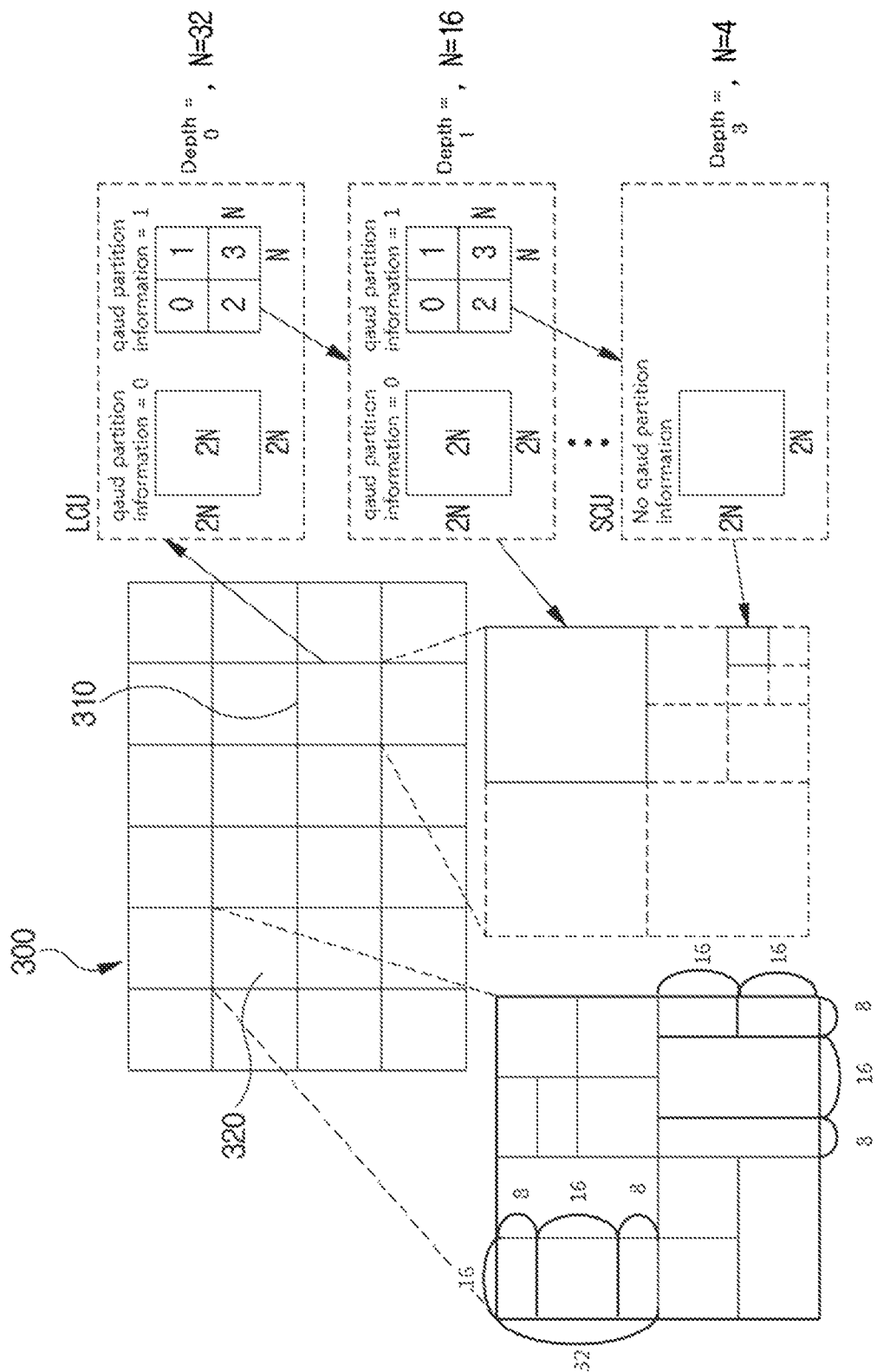
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within a CTU 310. Such a distribution may be determined according to whether or not to partition a single CU into a plurality (positive integer equal to or greater than 2 including 0, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of a CTU may be 0, and a depth of a smallest coding unit (SCU) may be a predefined maximum depth. Herein, the CTU may be a coding unit having a maximum coding unit size, and the SCU may be a coding unit having a minimum coding unit size as described above. Partitioning is started from the CTU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, a CTU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned (quad-tree partitioned) into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. For example, when a coding unit having a size of 8×32 is horizontally partitioned into two sub-coding units, each of the two sub-coding units may have a size of 8×16. When a single coding unit is partitioned into two coding units, it may be called that the coding unit is partitioned (binary-tree partitioned) in a binary-tree form.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-tree partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is partitioned by a multi-type tree partition structure, the coding unit may further include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is partitioned by a multi-type tree partition structure, the current coding unit may further include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quad-tree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bitstream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a tile level, a tile group level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra slice and an inter slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra slice, the maximum size of a ternary tree may be 32×32. For example, for an inter slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-tree partitioned or ternary-tree partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-tree partitioned or ternary-tree partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-tree partitioned and/or ternary-tree partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-tree partitioned and/or ternary-tree partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Figure 4:
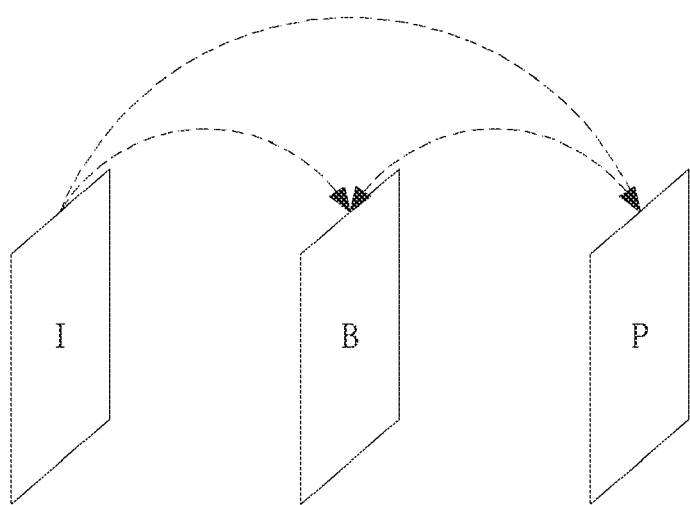
FIG. 4 is a view showing an inter-prediction process.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure. FIG. 4 is a diagram illustrating an embodiment of an inter-picture prediction process.

In FIG. 4, a rectangle may represent a picture. In FIG. 4, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Hereinafter, an image encoding/decoding method using motion vector refinement, according to one embodiment of the present invention, will be described with reference to the drawings.

Figure 5:
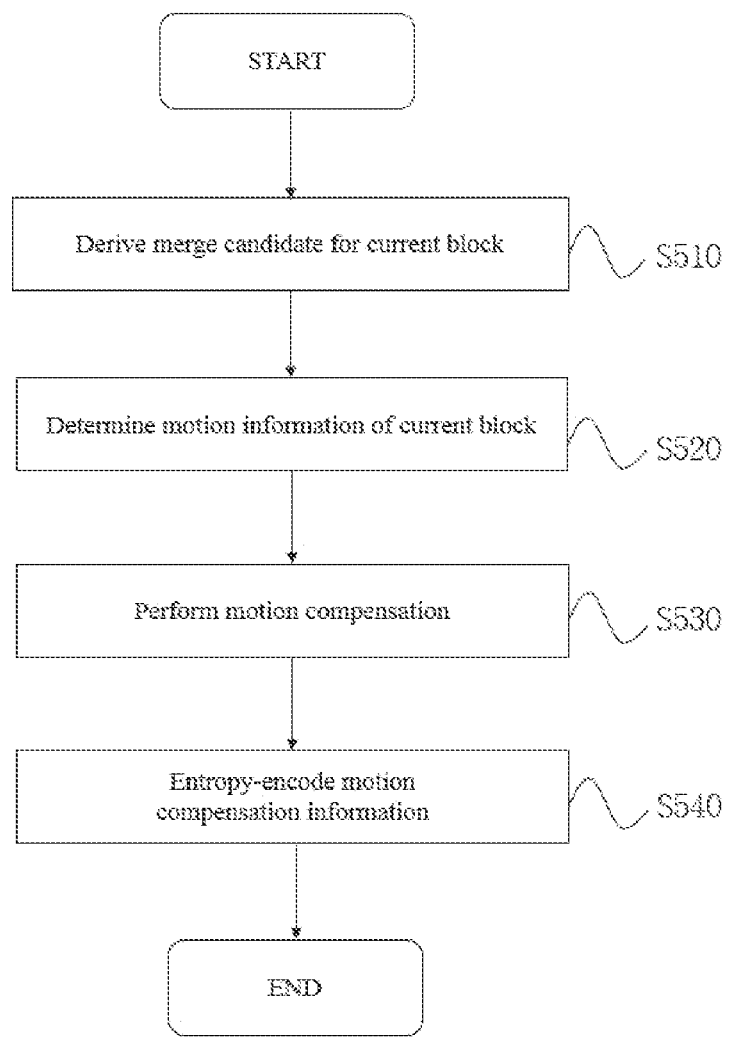
FIG. 5 is a flowchart illustrating an image encoding method according to an embodiment of the present invention.
Figure 6:
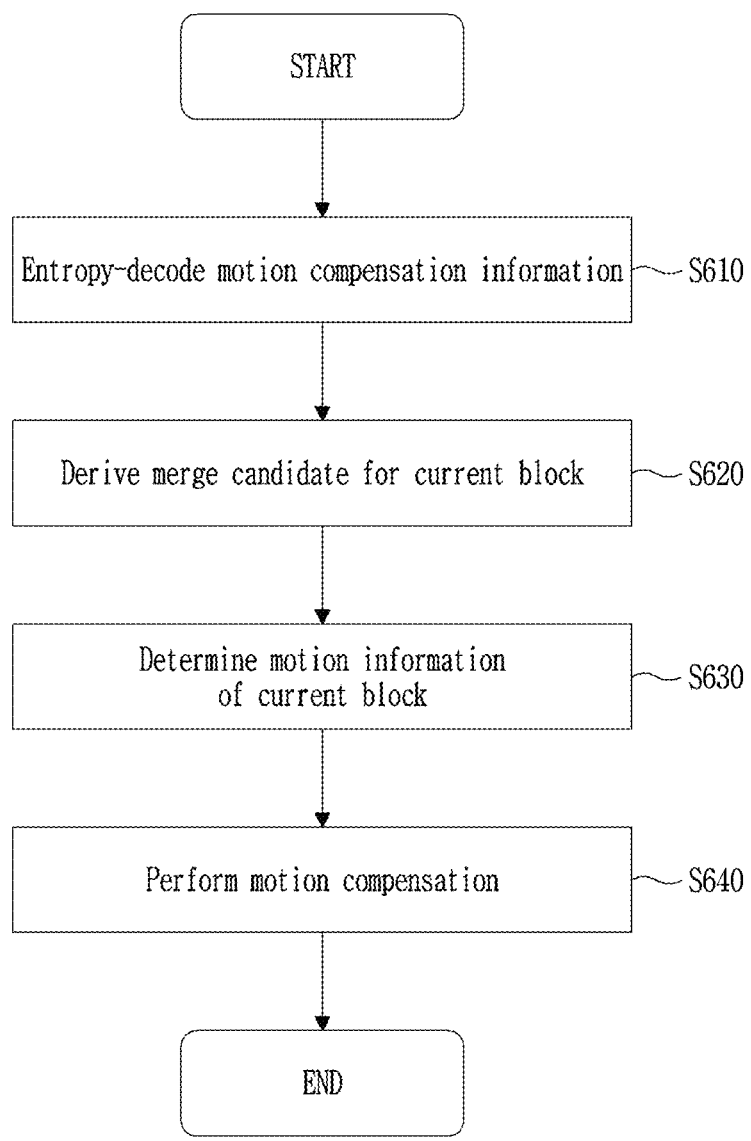
FIG. 6 is a flowchart illustrating an image decoding method according to an embodiment of the present invention.

FIG. 5 is a flowchart illustrating an image encoding method according to an embodiment of the present invention, and FIG. 6 is a flowchart illustrating an image decoding method according to an embodiment of the present invention.

Referring to FIG. 5, an image encoding method according to one embodiment of the present invention includes a step of deriving a merge candidate for a current block (S510), a step of determining motion information of the current block (S520), a step of performing motion compensation on the current block (S530), and a step-f entropy-encoding information associated with motion compensation (S540).

Referring to FIG. 6, an image decoding method according to one embodiment of the present invention includes a step of entropy-decoding motion compensation information for a current block (S610), a step of deriving a merge candidate for the current block (S620), a step of determining motion information of the current block using the derived merge candidate (S630), and a step of performing motion compensation using the determined motion information (S640).

Here, the deriving of a merge candidate (S510, S620) means a process of deriving at least one of a spatial merge candidate, a temporal merge candidate, and an additional merge candidate for the current block. In this case, the deriving of a spatial merge candidate means a process of deriving a spatial merge candidate and adding the derived spatial merge candidate to a merge candidate list. The deriving of a temporal merge candidate means a process of deriving a temporal merge candidate and adding the derived temporal merge candidate to the merge candidate list.

Figure 7:
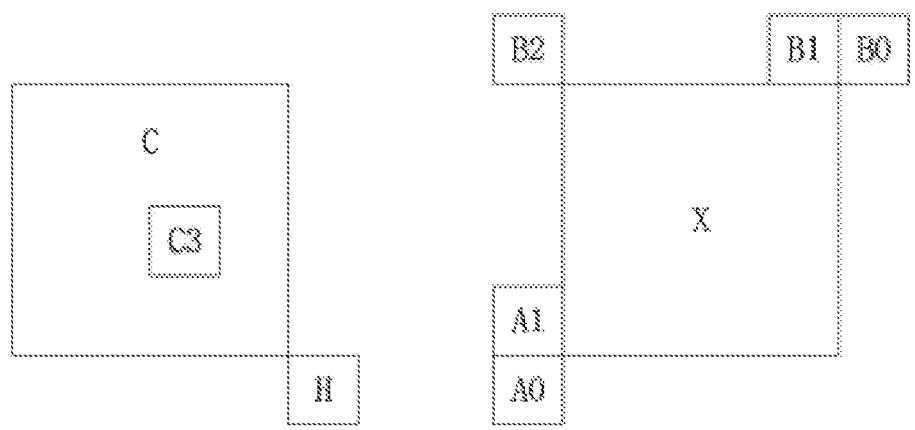
FIG. 7 is a diagram illustrating an exemplary method of deriving a spatial merge candidate and a temporal merge candidate for a current block.

FIG. 7 is a diagram illustrating an exemplary method of deriving a spatial merge candidate and a temporal merge candidate for a current block.

Referring to FIG. 7A, spatial merge candidates for a current block X is derived from neighboring blocks adjacent to the current block X. The neighboring blocks adjacent to the current block include a block B1 adjacent to the upper boundary of the current block, a block A1 adjacent to the left boundary of the current block, a block B0 adjacent to the upper right corner of the current block, a block B2 adjacent to the upper left corner of the current block, and a block A0 adjacent to the lower boundary of the current block.

In order to derive a spatial merge candidate for the current block, the encoder or the decoder determines whether neighboring blocks adjacent to the current block are available for derivation of spatial merge candidates for the current block. When determining whether neighboring blocks adjacent to the current block are available for derivation of spatial merge candidates, the neighboring blocks are sequentially scanned according to a predetermined priority. For example, spatial merge candidate availability is determined in the block order of A1, B1, B0, A0 and B2. The encoder or the decoder sequentially add the spatial merge candidates determined according to the predetermined priority order (availability determination order) to a merge candidate list.

For example, when four spatial merge candidates are derived from neighboring blocks located at positions A1, B0, A0, and B2, the derived four spatial merge candidates are sequentially added to the merge candidate list.

The encoder or the decoder derives spatial merge candidates by referring to at least one of the coding parameters.

Here, the motion information of a spatial merge candidate includes three or more pieces of motion information, including not only L0 motion information and L1 motion information but also L2 motion information and L3 motion information. The reference picture list means at least one of L0, L1, L2, and L3 lists.

The temporal merge candidates for the current block are derived from reconstructed blocks included in a collocated picture of the current picture. Here, the collocated picture means a picture that is previously encoded/decoded prior to the current picture and differs in temporal order from the current picture.

Referring to FIG. 7B, the temporal merge candidates for a current block are derived from blocks within a collocated picture of the current picture, including a block corresponding to a position spatially identical to the position of the current block, a block including a position within the block corresponding to a position spatially identical to the position of the current block, and neighboring blocks of the block corresponding to a position spatially identical to the position of the current block. Here, the temporal merge candidate refers to motion information of a collocated block.

For example, a temporal merge candidate of the current block is derived from a block H adjacent to the lower right corner of a block C corresponding to a position spatially identical to the position of the current block or a block C3 including the center position of the block C. The block H and the block C3 used for deriving temporal merge candidates of the current block are referred to as collocated blocks.

When a temporal merge candidate can be derived from the block H including a position outside the block C, the block H is set as the collocated block of the current block. In this case, a temporal merge candidate of the current block is derived from motion information of the block H. On the other hand, when a temporal merge candidate of the current block cannot be derived from the block H, the block C3 including a position within the block C is set as the collocated block of the current block. In this case, a temporal merge candidate of the current block is derived from motion information of the block C3. When a temporal merge candidate of the current block can be derived from neither the block H nor the block C3, a temporal merge candidate of the current block is not derived, or is derived from a block other than the block H and the block C3. For example, when a temporal merge of the current block can be derived from neither the block H nor the block C3, the block H and the block C3 are all encoded with an intra prediction mode.

Alternatively, temporal merge candidates of the current block are derived from multiple blocks within a collocated picture. For example, multiple temporal merge candidates of the current block are derived from the block H and the block C3.

When the distance between the current picture including the current block and the reference picture of the current block is different from the distance between the collocated picture including the collocated block and the reference picture of the collocated block, the motion vector of a temporal merge candidate of the current block is obtained by scaling the motion vector of the collocated block. Here, the scaling is performed according to the distance between the current picture and the reference picture of the current block and/or the distance between the collocated picture and the reference picture of the collocated block.

For example, it is possible to obtain a temporal merge candidate of the current block by scaling the motion vector of a collocated block according to a ratio of the distance between the current picture and the reference picture of the current block and the distance between the collocated picture and the reference picture of the collocated block.

In addition, at least one of a temporal merge candidate, a collocated picture, a collocated block, a prediction list utilization flag, and a reference picture index is derived according to at least one of the coding parameters of the current block, neighboring block, or collocated block.

The encoder or the decoder generates a merge candidate list by deriving at least one merge spatial and/or temporal merge candidate and sequentially adding the derived spatial and/or temporal merge candidates to a merge candidate list in the order in which the spatial and/or temporal merge candidates are derived.

Next, a method of deriving an additional merge candidate of the current block will be described.

The additional merge candidate refers to at least one of a modified spatial merge candidate, a modified temporal merge candidate, a combined merge candidate, and a merge candidate having a predetermined motion information value. Here, the deriving of an additional merge candidate means that the encoder or the decoder derives additional merge candidates and adds them to the merge candidate list.

The modified spatial merge candidate means a merge candidate that is obtained by modifying at least one piece of the motion information of a derived spatial merge candidate. The modified temporal merge candidate means a merge candidate that is obtained by modifying at least one piece of motion information of a derived temporal merge candidate.

The combined merge candidate means a merge candidate derived by combining motion information of one or more merge candidates selected from among spatial merge candidates, temporal merge candidates, modified spatial merge candidates, modified temporal merge candidates, combined merge candidates, and merge candidates having a predetermined motion information value, which are all included in the merge candidate list.

The combined merge candidate also means a merge candidate derived by combining motion information of one or more merge candidates selected from among spatial merge candidates and temporal merge candidates that are not present in the merge candidate list but are derived from available blocks, modified merge candidates generated from these spatial merge candidates, modified temporal merge candidates generated from these temporal merge candidates, combined merge candidates, and merge candidates having a predetermined motion information value.

In addition, the decoder derives a combined merge candidate by using motion information that is obtained by entropy-decoding a bitstream. In this case, the encoder entropy-encodes motion information to be used to derive the combined merge candidate into the bitstream.

The combined merge candidate also refers to a combined bi-prediction merge candidate. The combined bi-prediction merge candidate is a merge candidate that uses bi-prediction. In other words, the combined bi-prediction merge candidate is a merge candidate having L0 motion information and L1 motion information.

For example, the merge candidate having a predetermined motion information value means a zero merge candidate whose motion vector is (0,0). The merge candidate having a predetermined motion information value is predefined and the predetermined motion information value is set commonly in the encoder and the decoder.

At least one merge candidate among a modified spatial merge candidate, a modified temporal merge candidate, a combined merge candidate, and a merge candidate having a predetermined motion information value is derived according to one or more coding parameters selected from among coding parameters of a current block, coding parameters of neighboring blocks, and coding parameters of collocated blocks. Then, the at least one merge candidates among a modified spatial merge candidate, a modified temporal merge candidate, a combined merge candidate, and a merge candidate having a predetermined motion information value is added to the merge candidate list according to at least one of the coding parameters of the current block, neighboring blocks, and collocated blocks.

The size of the merge candidate list is determined according to the coding parameters of the current block, the neighboring block, or the collocated block. The size of the merge candidate list varies according to the coding parameters.

When deriving a merge candidate, a refined motion vector generated by a motion vector refinement method according to the present invention can be used.

Next, the step of determining motion information of the current block will be described in detail (S520, S630).

The encoder selects a merge candidate to be used for motion compensation of the current from among the merge candidates included in a merge candidate list by performing motion estimation, and encodes a merge candidate index (merge_idx) indicating the selected merge candidate into a bitstream.

For example, to generate a prediction block of the current block, the encoder determines the motion information of the current block by selecting a merge candidate from among merge candidates in a merge candidate list by referring to a merge candidate index. Next, motion compensation is performed on the current block on the basis of the determined motion information.

The decoder decodes a merge candidate index in a bitstream and specifies a merge candidate indicated by the decoded merge candidate index among merge candidates included in a merge candidate list. The motion information of the specified merge candidate is determined as the motion information of the current block. The determined motion information is used for motion compensation of the current block. In this case, the motion compensation means an inter prediction (i.e., inter picture prediction).

Next, the step of performing motion compensation will be described in detail (S530, S640)

The encoder or the decoder performs inter prediction or motion compensation using the determined motion information. Here, the current block has the same motion information the selected merge candidate.

The current block has one or more motion vectors (a maximum of N motion vectors) depending on the prediction direction. The encoder or the decoder generates a minimum of one prediction block and a maximum of N prediction blocks by using the motion vector(s) to obtain a final prediction block of the current block.

For example, when the current block has one motion vector, the encoder or the decoder determines a prediction block generated by using the motion vector (or motion information) as the final prediction block of the current block.

On the other hand, when the current block has multiple motion vectors (or motion information), the encoder or the decoder generates multiple prediction blocks by using the multiple motion vectors (or motion information) and determines a final prediction block of the current block by performing a weighted sum portion on the multiple prediction blocks. The reference pictures including the respective prediction blocks indicated by the respective multiple motion vectors (or motion information) may be included in different reference picture lists or in the same reference picture list.

For example, the encoder or a decoder generates multiple prediction blocks on the basis of at least one of spatial motion vector candidates, temporal motion vector candidates, motion vectors having a predetermined value, and combined motion vector candidates, and determines a final prediction block of the current block on the basis of the weighted sum of the multiple prediction blocks.

Alternatively, the encoder or the decoder may generate multiple prediction blocks on the basis of the motion vector candidates indicated by a predetermined motion vector candidate index, and determines a final prediction block of the current block on the basis of the weighted sum of the multiple prediction blocks. Further alternatively, the encoder or the decoder may generate multiple prediction blocks on the basis of the motion vector candidates indicated by motion vector candidate indexes in a specific range and determines a final prediction block of the current block on the basis of the weighted sum of the multiple prediction blocks.

To this end, the weights applied to the respective prediction blocks may have the same value of 1/N. N is the number of the generated prediction blocks. For example, when two prediction blocks are generated, the weights applied to the respective prediction blocks are ½ and ½, respectively. On the other hand, when three prediction blocks are generated, the weights applied to the respective prediction blocks is ⅓, ⅓, and ⅓, respectively. When four prediction blocks are generated, the weight applied to each prediction block is ¼.

Alternatively, the encoder or the decoder may determine a final prediction block of the current block by applying different weights to the respective prediction blocks.

The weights applied to the prediction blocks are not necessarily fixed values but may be variable values. The weights applied to the respective prediction blocks can be equal to each other or can be different from each other. For example, when two prediction blocks are generated, examples of the weights applied to the two prediction blocks include (½, ½), (⅓, ⅔), (¼, ¾), (⅖, ⅗), and (⅜, ⅝). On the other hand, each of the weights is a positive real number or a negative real number. For example, the weights may include a negative real number. That is, the weights may be (−½, 3/2), (−⅓, 4/3), or (−¼, 5/4)

On the other hand, in order to apply variable weights to the prediction blocks, weight information of the current block is signaled via a bit stream. The weight information is signaled on a per prediction block basis or a per reference picture basis. Multiple prediction blocks may have the same weight information.

The encoder or the decoder determines whether a predicted motion vector (prediction motion information) is used or not on the basis of a prediction block list utilization flag. For example, when the prediction block list utilization flag has a first value of 1 for each reference picture list, it means that the encoder or the decoder can use the predicted motion vector of the current block to perform inter prediction or motion compensation. On the other hand, when the prediction block list utilization flag has a second value of 0, the encoder or the decoder does not use the predicted motion vector of the current block to perform the inter prediction or motion compensation of the current block. Conversely, the first value and the second value of the prediction block list utilization flag can be set to 0 and 0, respectively.

Equation 1 to Equation 3 represent a method of determining a final prediction block of the current block for a case where the inter prediction indicator of the current block is PRED_BI, a case where the inter prediction indicator of the current block PRED_TRI, and a case where the inter prediction indicator of the current block is PRED_QUAD when a prediction direction for each reference picture list is a single direction.

$$P\_BI = (WF\_L0 * P\_L0 + OFFSET\_L0 + WF\_L1 * P\_L1 + OFFSET\_L1 + RF') \gg 1 \quad [\text{Equation 1}]$$

$$P\_TRI = (WF\_L0 * P\_L0 + OFFSET\_L0 + WF\_L1 * P\_L1 + OFFSET\_L1 + WF\_L2 * P\_L2 + OFFSET\_L2 + RF')/3 \quad [\text{Equation 2}]$$

$$P\_QUAD = (WF\_L0 * P\_L0 + OFFSET\_L0 + WF\_L1 * P\_L1 + OFFSET\_L1 + WF\_L2 * P\_L2 + OFFSET\_L2 + WF\_L3 * P\_L3 + OFFSET\_L3 + RF') \gg 2 \quad [\text{Equation 3}]$$

In Equations 1 to 3, P_BI, P_TRI, and P_QUAD represent a final prediction block of the current block, and LX (X=0, 1, 2, 3) represents a reference picture list. WF_LX denotes the weighted value of a prediction block generated using the reference picture list LX, and OFFSET_LX denotes an offset value of a prediction block generated using the reference picture list LX. P_LX represents a prediction block generated using a motion vector (or motion information) with respect to the reference picture list LX of the current block. RF represents a rounding factor which is 0, a positive number, or a negative number. The reference picture list LX includes at least one of the following reference pictures: a long-term reference picture, a reference picture that has not passed a deblocking filter, a reference picture that has not passed a sample adaptive offset (SAO), a reference picture that has not passed an adaptive loop filter (ALF), a reference picture that has passed a deblocking filter (DF) and an adaptive offset, a reference picture filter that has passed a deblocking filter and an adaptive loop filter, a reference picture that has passed a sample adaptive offset and an adaptive loop filter, and a reference picture that has passed a deblocking filter, a sample adaptive offset, and an adaptive loop filter. In this case, the LX reference picture list is the reference picture list L2 or the reference picture list L3.

When a predetermined picture list involves multiple prediction blocks, the final prediction block of the current block is obtained on the basis of the weighted sum of multiple prediction blocks. In this case, the weights applied to the prediction blocks derived from the same reference picture list have the same value or have different values.

The weight WF_LX or the offset OFFSET_LX for each prediction blocks is a coding parameter to be entropy-encoded/decoded. In another example, the weights and offsets are derived from the encoded/decoded neighboring blocks adjacent to the current block. Here, the neighboring blocks adjacent to the current block includes a block used to derive a spatial motion vector candidate of the current block, a block used to derive a temporal motion vector candidate of the current block, or both.

In another example, the weights and offsets of the current block are determined depending on the display order (i.e., picture order count (POC)) of each reference picture. In this case, as the distance between the current picture and the reference picture increases, the weight or offset is set to a smaller value. Conversely, as the distance between the current picture and the reference picture decreases, the weight or offset is set to a larger value.

For example, when the POC difference between the current picture and the L0 reference picture is 2, the weight applied to the prediction block generated by referring to the L0 reference picture is set to ⅓. On the other hand, when the POC difference between the current picture and the L0 reference picture is 1, the weight applied to the prediction block generated by referring to the L0 reference picture is set to ⅔. That is, the weight or offset is inverse proportional to the POC difference between the current picture and the reference picture. Alternatively, the weight or offset may be proportional to the POC difference between the current picture and the reference picture.

Alternatively, the encoder or the decoder entropy-encodes/decodes the weight and/or the offset of the current block, on the basis of at least one of the coding parameters. Alternatively, the encoder or the decoder calculates the weighted sum of the prediction blocks on the basis of at least one of the coding parameters.

The weighted sum of the multiple prediction blocks is applied only to a partial area within a prediction block. Here, the partial area means a boundary of a prediction block. In order to apply the weighted sum to only a partial area as described above, the encoder or the decoder performs a weighted sum operation on each sub-block within a prediction block.

For each of the sub-blocks that are present within a block indicated by area information, inter prediction or motion compensation is performed by using the same prediction block or the same final prediction block.

In addition, for each of the sub-blocks having a deeper block depth than a block indicated by area information, inter prediction or motion compensation is performed by using the same prediction block or the same final prediction block.

When calculating the weighted sum of the prediction blocks by using the prediction of a motion vector, the encoder or the decoder calculates the weighted sum by using at least one motion vector candidate within a motion vector candidate list, and uses the weighted sum (weighted prediction block) as the final prediction block of the current block.

For example, the encoder or the decoder generates prediction blocks using only spatial motion vector candidates, calculates the weighted sum of the prediction blocks, and uses the weighted sum (weighted prediction block) as the final prediction block of the current block.

Alternatively, the encoder or a decoder may generate prediction blocks using spatial motion vector candidates and temporal motion vector candidates, calculates the weighted sum of the prediction blocks, and use the weighted sum (weighted prediction block) as the final prediction block of the current block.

Further alternatively, the encoder or the decoder generates prediction blocks using only combined motion vector candidates, calculates the weighted sum of the prediction blocks, and uses the weighted sum (weighted prediction block) as the final prediction block of the current block.

Further alternatively, the encoder or the decoder generates prediction blocks using only motion vector candidates indicated by a specific motion vector candidate index, calculates the weighted sum of the prediction blocks, and uses the weighted sum (weighted prediction block) as the final prediction block of the current block.

Further alternatively, the encoder or the decoder generates prediction blocks using only motion vector candidates indicated by a specific range of motion vector candidate indexes, calculates the weighted sum of the prediction blocks, and uses the weighted sum (weighted prediction block) as the final prediction block of the current block.

When calculating the weighted sum of the prediction blocks by using a merge mode, the encoder or the decoder calculates the weighted sum by using at least one merge candidate existing within a merge candidate list, and uses the weighted sum (weighted prediction block) as the final prediction of the current block.

For example, the encoder or the decoder generates prediction blocks using only spatial merge candidates, calculates the weighted sum of the prediction blocks, and uses the weighted sum (weighted prediction block) as the final prediction block of the current block.

In addition, for example, the encoder or the decoder generates prediction blocks using both spatial merge candidates and temporal merge candidates, calculates the weighted sum of the predicted blocks, and uses the weighted sum (weighted predicted block) as the final prediction block of the current block.

In addition, for example, the encoder or the decoder generates prediction blocks using only combined merge candidates, calculates the weighted sum of the prediction blocks, and uses the weighted sum (weighted prediction block) as the final prediction block of the current block.

In addition, for example, the encoder or the decoder generates prediction blocks using only merge candidates having a specific merge candidate index, calculates the weighted sum of the prediction blocks, and uses the weighted sum (weighted prediction block) as the final prediction block of the current block.

In addition, for example, the encoder or the decoder generates prediction blocks using only merge candidates having merge candidate indexes within a specific range, calculates the weighted sum of the prediction blocks, and uses the weighted sum (weighted prediction block) as the final prediction block of the current block.

The encoder or the decoder performs motion compensation using the motion vector (motion information) of the current block. In this case, a final prediction block which is a result of the motion compensation is generated by using east one prediction block. Here, the current block means a current coding block, a current prediction block, or both.

Next, the step (S540 and S610) of entropy-encoding/decoding motion compensation information will be described in detail The encoder entropy-codes "information associated with compensation" (hereinafter, referred to as motion compensation information) into a bitstream, and the decoder entropy-decodes the motion compensation information, which is included in the bitstream. The motion compensation information to be entropy-encoded/decoded includes at least one of the inter prediction indicators (Inter_pred_idc), reference picture indexes (ref_idx_10, ref_idx_11, and ref_idx_12, ref_idx_13), motion vector candidate indexes (mvp_10_idx, mvp_11_idx, mvp_12_idx, and mvp_13_idx), a motion vector difference, skip mode utilization information (cu_skip_flag), merge mode utilization information (merge_flag), merge index information (merge_index), merge mode-based motion vector refinement utilization information (fruc_flag), weights (wf_10, wf_11, wf_12, and wf_13), and offsets (offset_10, offset_11, offset_12, and offset_13).

When the current block is encoded/decoded by inter prediction, the inter prediction indicator indicates the inter prediction direction of the current block and/or the number of prediction directions of the current block, For example, the inter prediction indicator indicates a unidirectional prediction or a multi-directional prediction (for example, a bi-directional prediction, a three-direction prediction, or a four-direction prediction). The inter prediction indicator also indicates the number of reference pictures to be used to generate prediction blocks of the current block. One reference picture can be used for multiple-direction predictions. In this case, predictions of N directions (N> M) are performed using M reference pictures. In addition, the inter prediction indicator indicates the inter prediction mode of the current block or the number of prediction blocks used for motion compensation of the current block.

The reference picture indicator indicates a directionality of prediction, such as uni-direction (PRED_LX), bi-direction (PRED_BI), three-direction (PRED_TRI), four-direction (PRED_QUAD) or more multi-direction, i.e., the number of prediction directions in the current block.

The prediction list utilization flag indicates whether to generate a prediction block using an associated reference picture list.

The reference picture index specifies a reference picture to be referred to by the current block among reference pictures within a reference picture list. For each reference picture list, one or more reference picture indexes is entropy-encoded/decoded. Motion compensation is performed by using one or more reference picture indexes for the current block.

The motion vector candidate index indicates a motion vector candidate of the current block for each respective reference picture list or each respective reference picture index. At least one motion vector candidate index for each motion vector candidate list is entropy-encoded/decoded. At least one motion vector candidate index is used to perform motion compensation of the current block.

The motion vector difference represents the value of difference between an original motion vector and a predicted motion vector. One or more motion vector differences are entropy-encoded/decoded for each of the motion vector candidate lists corresponding to the respective reference picture indexes or corresponding to the respective reference picture lists. One or more motion vector differences are used for motion compensation of the current block.

Regarding the skip mode utilization information (cu_skip_flag), a first value of 1 indicates that a skip mode is used and a second value of 0 indicates that a skip mode is not used. The motion compensation of the current block is performed according to the skip mode utilization information.

Regarding the merge mode utilization information (merge_flag), a first value of 1 indicates that a merge mode is used and a second value of 0 indicates that a merge mode is not used. The motion compensation of the current block is performed according to the merge mode utilization information.

The merge index information (merge_index) means information indicating a merge candidate in a merge candidate list.

For example, the merge index information means information of a merge index.

In addition, for example, the merge index information indicates a reconstructed neighboring block from which the merge candidate has been derived, among the reconstructed neighboring blocks spatially/temporally adjacent to the current block.

In addition, for example, the merge index information indicates at least one piece of the motion information of the merge candidate. For example, a first value (for example, 0) of the merge index information indicates the first merge candidate in a merge candidate list, a second value (for example, 1) indicates the second merge candidate in the merge candidate list, and a third value (for example, 2) indicates the third merge candidate in the merge candidate list. Likewise, fourth to N-th values indicate the fourth to N-th merge candidates in the merge candidate list, respectively. Where N is a positive integer or zero.

The motion compensation of the current block is performed on the basis of the merge mode index information.

The merge mode-based motion vector refinement utilization information (fruc_flag) is information indicating whether a merge mode-based motion vector refinement is performed or not. The merge mode-based motion vector refinement utilization information is entropy-encoded/decoded on a per coding unit basis or a per prediction block basis.

For example, as to the merge mode-based motion vector refinement utilization information, a first value of 1 indicates that merge mode-based motion vector refinement is performed and a second value of 0 indicates that the merge mode-based motion vector refinement is not performed. Here, the first value and the second value may be switched.

Alternatively, it may be determined whether to perform a motion vector refinement based on a different inter prediction mode (for example, skip mode, AMVP, etc.) which is predefined in the encoder and the decoder. That is, even when the merge mode-based motion vector refinement utilization information (fruc_flag) is not explicitly signaled, whether to use the motion vector refinement can be determined according to a predetermined criterion.

On the other hand, the merge mode-based motion vector refinement utilization information (fruc_flag) is entropy-decoded when the merge mode utilization information (merge_flag) has a first value indicating that the merge mode is used.

On the other hand, the merge mode-based motion vector refinement utilization information (fruc_flag) is entropy-decoded when the merge mode utilization information (merge_flag) has a second value indicating that the merge mode is not used.

When two or more prediction blocks are generated through the motion compensation of the current block, the final prediction block of the current block is generated by calculating the weighted sum of each prediction block. When calculating the weighted sum, weights and/or offsets are applied to the respective prediction blocks. At least one weighting factor selected from among a reference picture list, a reference picture, a motion vector candidate index, a motion vector difference, a motion vector, a skip mode utilization flag, a merge mode utilization flag, and merge index information is entropy—encoded/decoded. In addition, the weighting factor of each prediction block is entropy-encoded/decoded according to the inter prediction indicator. Here, the weighting factor includes a weight, an offset, or both.

When motion compensation information is entropy-encoded/decoded on a per CTU basis, motion compensation is performed, using the motion compensation information, on all or part of the blocks within a CTU, depending on the value of the motion compensation information.

When the motion compensation information is entropy-encoded/decoded at a CTU level or a sub-CTU level, motion compensation information is entropy-encoded/decoded depending on at least one of a predetermined block size or a predetermined block depth.

Here, information of a predetermined block size or a predetermined block depth is additionally entropy-encoded/decoded. Alternatively, information of a predetermined block size or a predetermined block depth is determined according to at least one of a value preset in the encoder and decoder, a coding parameter, and a syntax element value.

The motion compensation information is entropy-encoded/decoded only in a block having a block size which is equal to or larger than a predetermined block size. However, the motion compensation information is not entropy-encoded/decoded in a block having a block size smaller than the predetermined block size.

In this case, sub-blocks within a block having a block size equal to or larger than the predetermined block size are subjected to motion compensation based on the entropy-encoded/decoded motion compensation information of the block having a block size equal to or larger than the predetermined block size. That is, the sub-blocks in a block having a block size equal to or larger than the predetermined block size share motion compensation information including a motion vector candidate, a motion vector candidate list, a merge candidate, and a merge candidate list.

The motion compensation information is entropy-encoded/decoded only in a block having a block depth which is equal to or less than a predetermined block depth value, and the motion compensation information is not entropy-encoded/decoded in a block having a block depth greater than the predetermined block depth value.

In this case, sub-blocks in a block having a block depth equal to or less than the predetermined block depth value are subjected to motion compensation based on the entropy-encoded/decoded motion compensation information of the block having a block depth equal to or less than the predetermined block depth value. That is, the sub-blocks in a block having a block depth equal to or less than the predetermined block depth value share the motion compensation information including a motion vector candidate, a motion vector candidate list, a merge candidate, and a merge candidate list.

The motion compensation information is entropy-encoded/decoded on a per block basis or entropy-encoded/decoded in a higher level. For example, the motion compensation information is entropy-encoded/decoded on a per block basis (i.e., CTU by CTU, CU by CU, or PU by PU), or is entropy-encoded/decoded at a higher level, for example, a video parameter set, a sequence parameter set, a picture parameter set, an adaptation parameter set, a tile group header, or a slice header.

The motion compensation information is entropy-encoded/decoded according to a motion compensation information difference value that is a difference between motion compensation information and predicted motion compensation information (i.e., a predicted value of the motion compensation information).

Instead of entropy-encoding/decoding the motion compensation information of the current block, the motion compensation information of a previously encoded/decoded neighboring block can be used as the motion compensation information of the current block.

At least one piece of the motion compensation information is derived according to at least one of the coding parameters.

In addition, the decoder entropy-decodes at least one piece of the motion compensation information extracted from a bitstream according to at least one of the coding parameters. The encoder entropy-encodes at least one piece of the motion compensation information according to at least one of the coding parameters.

The motion compensation information includes at least one from among a motion vector, a motion vector candidate, a motion vector candidate value, a motion vector difference value, a motion vector prediction value, skip mode utilization information (skip_flag), merge mode utilization information (merge_flag), motion vector resolution information, overlapped block motion compensation information, local illumination compensation information, affine motion compensation information, decoder-side motion vector derivation information, and bi-directional optical flow information. Here, the decoder-side motion vector derivation means a pattern matched motion vector derivation.

The motion vector resolution information means information indicating a specific resolution of a motion vector, a motion vector difference value, or both. Here, the resolution means precision. In addition, a specific resolution is selected from among a 16-pel, an 8-pel, a 4-pel, an integer-pel, a ¹⁄₁₆-pel, a ¼-pel, a ⅛-pel, a ¹⁄₃₂-pel, and a ¹⁄₆₄-pel.

Here, the overlapped block motion compensation information means information indicating whether the weighted sum of prediction blocks of the current block is calculated by using a motion vector of a neighboring block spatially adjacent to the current block during the motion compensation of the current block.

The local illumination compensation information means information indicating whether to apply at least one of a weight and an offset when generating a prediction block of the current block. Here, the weight, the offset, or both are derived from a reference block.

The affine motion compensation information means information indicating whether to use an affine motion model during the motion compensation of the current block. Here, the affine motion model refers to a process of dividing one block into multiple sub-blocks by using multiple parameters and generating motion vectors of the sub-blocks by using a representative motion vector.

The decoder-side motion vector derivation information means information indicating whether a motion vector required for motion compensation is to be derived by the decoder. The motion vector information may not be entropy-encoded/decoded, depending on the decoder-side motion vector derivation information. For example, when the decoder-side motion vector derivation information indicates that the decoder uses a motion vector, the merge mode utilization information is entropy-encoded/decoded. That is, the decoder-side motion vector derivation information indicates whether the merge mode is used in the decoder.

The bi-directional optical flow information means information indicating whether motion compensation is performed by refining a motion vector on a per pixel basis or a per sub-block basis. Depending on the bi-directional optical flow information, the pixel-based motion vector or the sub-block-based motion vector is not entropy-encoded/decoded. Here, the motion vector refinement means changing a block-based motion vector value to a pixel-based motion vector value or to a sub-block-based motion vector value.

The encoder or the decoder performs motion compensation on the current block by using at least one of the motion compensation information, and entropy-encodes/decodes at least one piece of the motion compensation information.

When the motion compensation information is entropy-encoded/decoded, a binarization method, such as a truncated Rice binarization method, a K-th order Exp_Golomb binarization method, a limited K-order exponent-Golomb binarization method, a fixed-length binarization method, a unary binarization method, or a truncated unary binarization method, is used.

When the motion compensation information is entropy-encoded/decoded, a context model is determined according to at least one of the following information: neighboring blocks' motion compensation information or area information; previously encoded/decoded motion compensation information or area information; current block's block depth information, and current block's block size information.

When the motion compensation information is entropy-encoded/decoded, at least one of the neighboring blocks' motion compensation information, the previously encoded/decoded motion compensation information, the current block's block depth information, and the current block's block size information, is used as the motion compensation information of the current block.

Hereinafter, a specific embodiment of a motion vector refinement method according to the present invention will be described with reference to FIGS. 7 to 42.

To derive a motion vector of a current block, at least one of a skip/merge mode-based motion vector derivation method and an enhanced motion vector prediction mode-based derivation method is used. Here, the driving of a motion vector includes deriving a motion vector of the current block and deriving reference picture index information of the current block.

Hereinafter, the merge mode-based motion vector refinement method will be described in detail. However, the following description is applicable to a motion vector refinement method based on an inter prediction mode other than the merge mode as well as a motion vector refinement method based on the merge mode.

Figure 8:
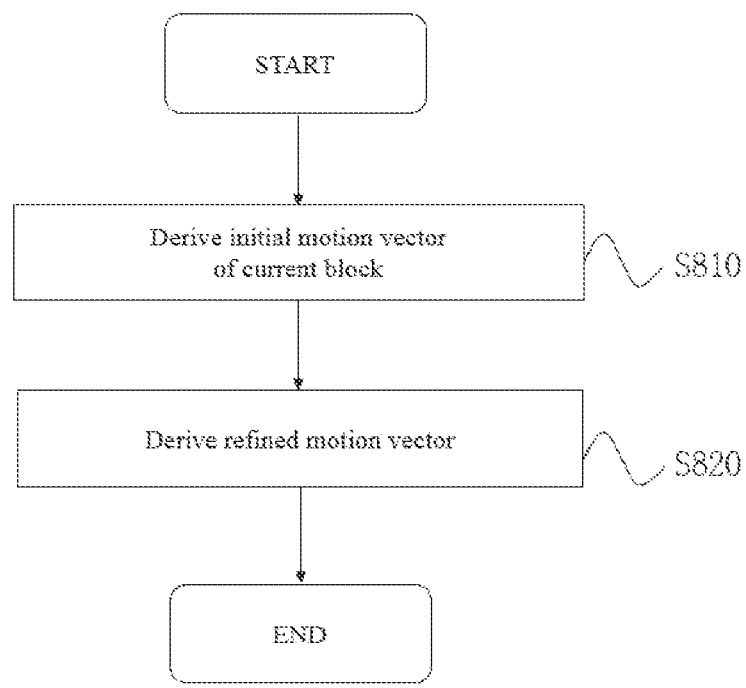
FIG. 8 is a flowchart illustrating a motion vector refinement method according to an embodiment of the present invention.

FIG. 8 is a flowchart illustrating a motion vector refinement method according to an embodiment of the present invention.

The motion vector refinement method according to the present invention includes a step S810 of deriving an initial motion vector of a current block and a step S820 of deriving a refined motion vector from the initial motion vector. In this case, the step S820 of deriving the refined motion vector includes deriving a motion vector refined in units of sub-blocks.

First, the step S810 of deriving the initial motion vector of the current block will be described in detail.

The initial motion vector of the current block is derived using a merge candidate that is present in a merge candidate list and is derived from a spatial neighboring block, a temporal neighboring block, or both.

Alternatively, the encoder or the decoder may construct an additional merge candidate list dedicated to the merge mode-based motion vector refinement.

Figure 9:
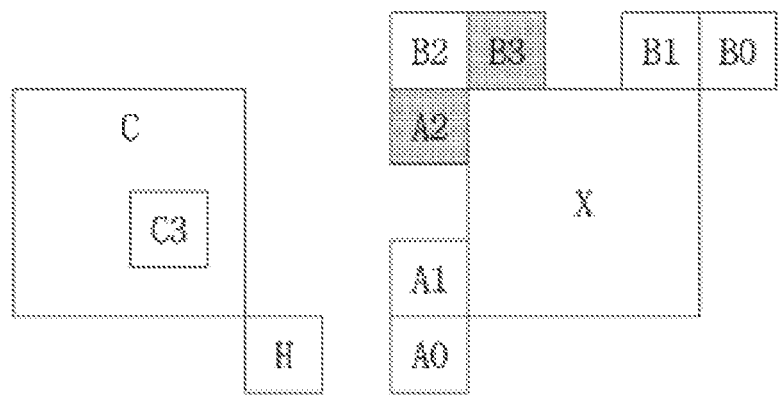
FIG. 9 is a diagram illustrating a spatial neighboring block and a temporal neighboring block used to construct an additional merge candidate list.

FIG. 9 is a diagram illustrating a spatial neighboring block and a temporal neighboring block used to construct the additional merge candidate list.

Referring to FIG. 9, when constructing the additional merge candidate list, a predetermined number of candidates are derived from spatial neighboring blocks A0, A1, A2, B0, A0, B2, and B3 in this order and are then inserted into a merged candidate list in order of A1, B1, B0, A0, B2, B3, and A2. Then, merged candidates derived from temporal neighboring blocks, combined bi-directional prediction merge candidates, and zero merge candidates are inserted into another additional merge candidate list.

The encoder or the decoder entropy-encodes/decodes information indicating a maximum number of candidates to be included in the additional merge candidate list to be used for the merge mode-based motion vector refinement, at one or more levels selected from among a video parameter set, a sequence parameter set, a picture parameter set, an adaptation parameter set, a tile group header, a slice header, a tile, a CTU, and a block.

The maximum number of candidates to be included in the additional merge candidate list to be used for the merge mode-based motion vector refinement is set commonly in the encoder and the decoder.

When constructing the merge mode candidate list to be used for the merge mode-based motion vector refinement, when the spatial neighboring blocks are within the same motion estimation region (MER), the information of the neighboring blocks is not included in the list.

The largest coding unit (LCU) is divided into N non-overlapped motion estimation regions, and the coding units belonging to the same motion estimation region (MER) undergo parallel motion prediction.

Figure 10:
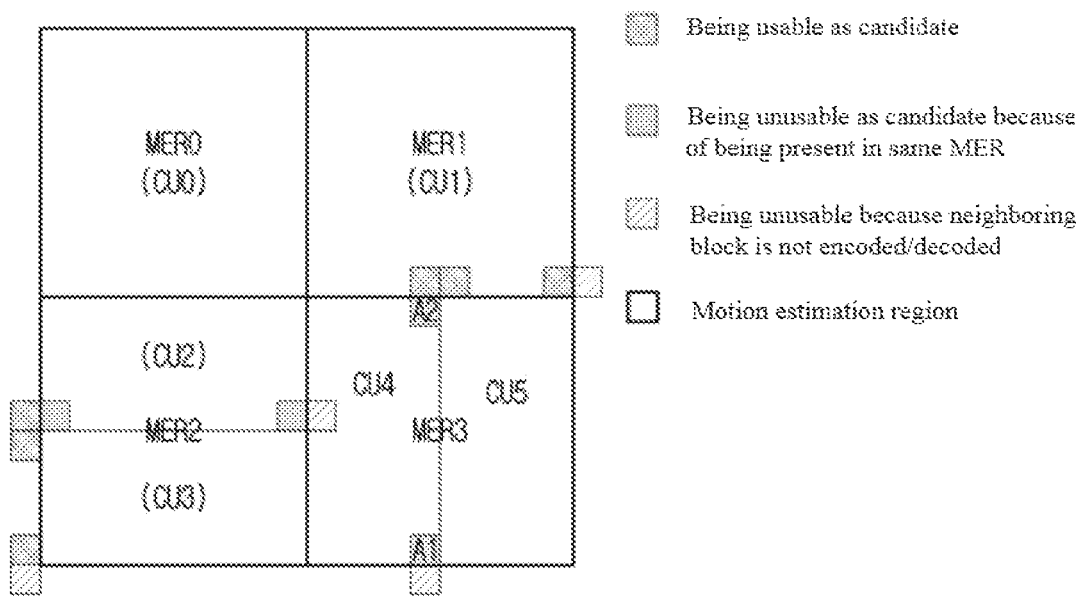
FIG. 10 is a diagram illustrating a motion vector refinement method using a motion estimation region.

FIG. 10 is a diagram illustrating a motion vector refinement method using a motion estimation region.

As illustrated in FIG. 10, since left neighboring blocks A1 and A2 of a current block CU5 that is present within a motion estimation region MER3 belong to the same motion estimation region MER3, they are not included in the list.

Here, the motion estimation regions (MER) are generated by performing quad-tree partitioning on a largest coding unit (LCU) similarly in the encoder and the decoder. On the other hand, the partition information for generating the motion estimation regions (MER) is determined by the encoder and is then entropy-encoded/decoded at one or more levels selected from among a video parameter set, a sequence parameter set, a picture parameter set, an adaptation parameter set, a tile group header, and a slice header.

On the other hand, when using merge candidates within a merge candidate list, it is possible to derive an initial motion vector of the current block by using all or part of the merge candidates within the merge candidate list.

For example, when the merge candidates in the merge candidate list have motion information derived in units of sub-blocks (hereinafter, referred to as sub-block-based motion information), the encoder or the decoder replaces the merge candidates having the sub-block-based motion information, with motion information that is derived from additional spatial and/or temporal neighboring blocks during construction of the merge candidate list, or does not use the merge candidates having the sub-block-based motion information as the initial motion vectors.

In other words, when the merge candidates in the merge candidate list have motion information derived in units of sub-blocks, the encoder or the decoder uses those merge candidates as the initial motion vectors only when the size of the current block is equal to or smaller than a sub-block size that is preset or is signaled at a level of a sequence parameter set (SPS), a picture parameter set (PPS), a tile group header, a slice header, a tile, or a CTU.

In addition, for example, only when the merge type of the merge candidate in the merge candidate list is a general (basic) merge candidate (for example, MRG_TYPE_DEFAULT_N), which is not a sub-block-based merge candidate (for example, MRG_TYPE_SUBPU_ATMVP), the encoder or the decoder uses the motion vector candidate as the initial motion vector.

In addition, for example, when the merge type of the merge candidate in the merge candidate list is a current picture reference (CPR, e.g., MRG_TYPE_IBC or MRG_TYPE_CRP), the encoder or the decoder does not use the motion vector of the merge candidate as the initial motion vector.

In addition, for example, only N candidates in the merge candidate list are used as the initial motion vectors. Here, N is a natural number that is greater than 0 and does not exceed the maximum number of candidates included in the merge candidate list.

FIGS. 11 and 12 are diagrams illustrating an initial motion vector list construction method.

When merge candidate lists are constructed as illustrated in FIG. 11, initial motion vector lists for respective directions are constructed with merge candidates corresponding to the respective list directions. Here, the initial motion vector list includes a motion vector, a reference picture index, or both.

For example, the initial motion vector list takes only motion vectors out of the merge candidate lists, and the reference picture index uses a fixed predetermined value. Here, the fixed predetermined value is a value signaled to the decoder from the encoder or a value shared by the encoder and the decoder.

On the other hand, when the reference picture index information of a merge candidate in a merge candidate list does not match the predetermined reference picture index information of the initial motion vector list, the encoder or the decoder uses a scaled motion vector as the initial motion vector by reflecting a time distance (or POC difference).

When constructing the initial motion vector list, the encoder or the decoder does not add motion information when the same motion vector and the same reference picture index already exist in the list.

Figures 13, 14:
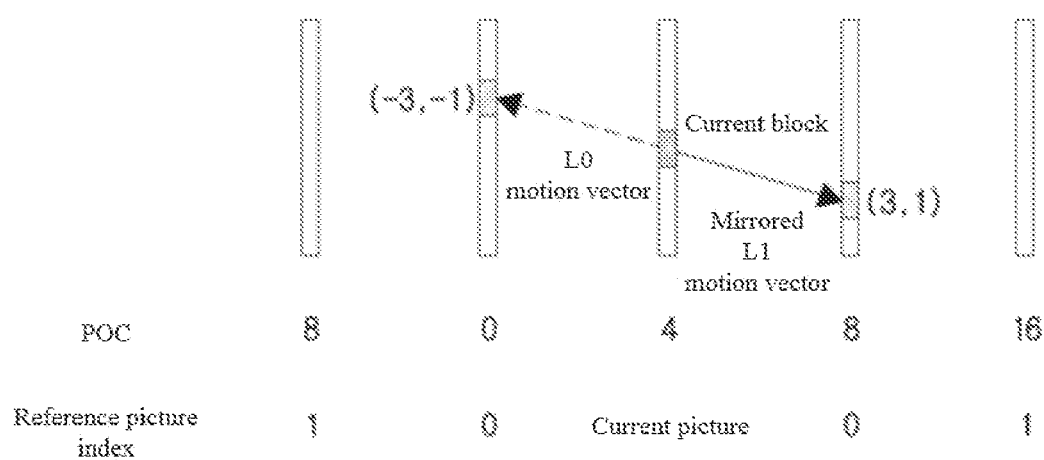
FIG. 13 is a diagram illustrating a method of deriving an initial motion vector using merge index information.
FIG. 14 is a diagram illustrating a method of mirroring a motion vector.

FIG. 13 is a diagram illustrating a method of deriving an initial motion vector using merge index information.

The motion information of a merge candidate corresponding to merge index information among merge candidates in a merge candidate list can be used as the initial motion vector.

As illustrated in FIG. 13, when a merge index information value is 3, the encoder or the decoder derives an L0 list [motion vector: (3, 1), reference picture index: 0] corresponding to the fourth candidate in the merge candidate list and an L1 list [motion vector: (−3,0), reference picture index: 0] as the initial motion vectors for the respective list directions.

On the other hand, when the merge index information value is 4, the encoder or the decoder derives only an L0 list [motion vector: (6,2), reference picture index: 0] corresponding to the fifth candidate in the merge candidate list as the initial motion vector. Here, the merge index information means index information indicating a merge mode.

On the other hand, a flag indicating whether the merge mode-based motion vector refinement is performed or not is defined. For example, when the motion vector refinement flag indicating whether the motion vector refinement is performed or not has a first value, the encoder or the decoder corrects the initial motion vector. On the other hand, when the motion vector refinement utilization flag has a second value, the encoder or the decoder does not perform an initial motion vector refinement. The motion vector refinement utilization flag may have a value signaled to the decoder from the encoder via a bitstream, and may be entropy-encoded/decoded on a per coding block basis.

In addition, the initial motion vector index information used for the merge mode-based motion vector refinement is further defined, and is then entropy-encoded/decoded on a per coding block basis. The motion vector index information may be a value used to indicate an initial motion vector to undergo the motion vector refinement, and may be a value defined separately from the merge index information.

For example, the initial motion vector index information is defined in the form of a flag value. For example, the initial motion vector index information may have a first value or a second value.

The encoder or the decoder uses the initial motion vector index information to select an initial motion vector to be used for the merge mode-based motion vector refinement from among multiple motion vector candidates.

In addition, a refinement motion vector parameter to be used for the merge mode-based motion vector refinement is defined, and is entropy-encoded/decoded on a per coding block basis. Here, the refinement motion vector refers to a motion vector that is to be added to the initial motion vector to obtain a refined motion vector.

For example, the refinement motion vector parameter includes refinement motion vector magnitude index information indicating the magnitude of the refinement motion vector and refinement motion vector direction index information indicating the direction of the refinement motion vector.

For example, the magnitude of the refinement motion vector has a value within a range of 1 to 128, and the refinement motion vector magnitude index information indicates one of the magnitude values of the refinement motion vector. For example, the refinement motion vector magnitude index information indicates a value that satisfies $2^N$ (N is an integer ranging from 0 to 7) among values in a range of 1 to 128. That is, the magnitude of the refinement motion vector has a value of 1, 2, 4, 8, 16, 32, 64, or 128.

Meanwhile, the encoder or the decoder obtains a final refinement motion vector by multiplying the refinement motion vector magnitude value (indicated by the refinement motion vector magnitude index information) by a predetermined value, or by performing a left shift operation on the refinement motion vector magnitude value. In this case, the predetermined value is a value defined commonly in the encoder and the decoder. For example, the predetermined value multiplied by the refinement motion vector magnitude value may be 4, and the predetermined value used in the left shift operation may be 2.

When the preset value used in the left shift operation is 2, the magnitude of the final refinement motion vector has a value of 4, 8, 16, 32, 64, 128, or 256, These values may be ¼, ½, 1, 2, 4, 8, 16, and 32, respectively in terms of an integer pixel unit.

On the other hand, the magnitude of the refinement motion vector is determined on a per integer pixel basis or a per sub-pixel basis. To this send, a refinement motion vector unit index information or flag (tile_group_fpel_mmvd_enabled_flag) indicating the unit magnitude of a refinement motion vector is defined, and this is entropy-encoded/decoded for each slice, tile, or tile group. In addition, for example, when the magnitude of a refinement motion vector is determined in units of integer pixels, the magnitude of the refinement motion vector has a value ranging from 4 to 512, and the refinement motion vector magnitude index information is one of those refinement vector magnitude values. For example, the refinement motion vector magnitude index information is a value satisfying $2^N$ (N is an integer ranging from 2 to 9) among values of 4 to 512.

Meanwhile, the encoder or the decoder obtains a final refinement motion vector by multiplying the refinement motion vector magnitude value (indicated by the refinement motion vector magnitude index information) by a predetermined value, or by performing a left shift operation on the refinement motion vector magnitude value. In this case, the predetermined value is a value defined commonly in the encoder and the decoder. For example, the predetermined value multiplied by the refinement motion vector magnitude value may be four, and the predetermined value used in the left shift operation may be two.

When the preset value used in the left shift operation is 2, the magnitude of the final refinement motion vector has a value of 16, 32, 64, 128, 256, 512, or 1024, This means 1, 2, 4, 8, 16, 32, 64, or 128 in terms of an integer pixel.

The encoder or the decoder derives a refinement motion vector for deriving a refined motion vector on the basis of a refinement motion vector parameter.

On the other hand, when using a merge candidate in a merge candidate list, the decoder does not entropy-decode merge index information and sets a merge candidate motion vector corresponding to a predetermined number among merge candidates in the merge candidate list as the initial motion vector. Here, the predetermined number is a number commonly set in the encoder and the decoder.

For example, when it is assumed that the motion vector corresponding to the first candidate in the merge candidate list is used as the initial motion vector in the encoder/decoder, the encoder or the decoder uses the L0 list [motion vector: (3,1), reference picture index: 0] corresponding to the first candidate in the merge candidate list of FIG. 13 and the L1 list [motion vector: (−2,0), reference picture index: 0].

On the other hand, when using a merge candidate in the merge candidate list, when the current block is a bi-directionally predictable block and has only motion information corresponding to the L0 or L1 list, new motion information that is derived from existing motion information can be used as additional initial motion information. Here, the existing motion information is motion information of another merge candidate in the same list.

When deriving the additional motion information on the basis of the existing motion information as described above, the additional motion vector to replace the motion information is derived on the basis of a reference picture indicated by the existing motion information, a current picture to which the current block belongs, or the time distance (or POC) between the reference pictures in a reference picture list for which motion information needs to be generated.

In particular, mirroring, scaling, or both are performed on the existing motion vector to derive an additional initial motion vector to replace a non-existing motion vector.

In FIG. 13, when the merge index information has a value of 2, there may be only L0 motion information. In this case, the L0 motion vector, which is mirrored with respect to a reference picture in the L1 reference picture list having a POC difference which is equal to the POC difference between a reference picture indicated by the L0 motion vector and a current picture to which the current block belongs, is derived as an L1 list motion vector.

In addition, except for a reference picture having the same POC as a reference picture indicated by the L0 motion vector among reference pictures within the L1 list, a picture with the lest POC difference from the current picture is derived as the L1 reference picture, and a scaled L0 motion vector that is scaled according to the POC difference between an L0 reference picture and the current picture and the POC difference between a derived L1 reference picture and the current picture is derived as the L1 motion vector.

FIG. 14 is a diagram illustrating a method of mirroring a motion vector.

Referring to FIG. 14, the L0 motion vector that is obtained by mirroring a reference picture in the L1 reference picture list, which has the POC difference equal to the POC difference between the reference picture indicated by the L0 motion vector and the picture to which the current block belongs is derived as the L1 motion vector.

Specifically, since the POC of the reference picture indicated by the L0 motion vector is 0 and the POC of the current picture is 4, the POC difference between the two pictures is 4. Since there is a reference picture having a POC difference of 4 from the current picture among reference pictures in the direction of the L1 list, a motion vector generated by mirroring the L0 motion vector, and the reference picture index of the reference picture is used as the L1 motion information. Here, the L1 motion vector generated by mirroring the L0 motion vector in the direction of the L1 list is (3, 1), and the L1 reference picture index is zero.

Figures 15, 16:
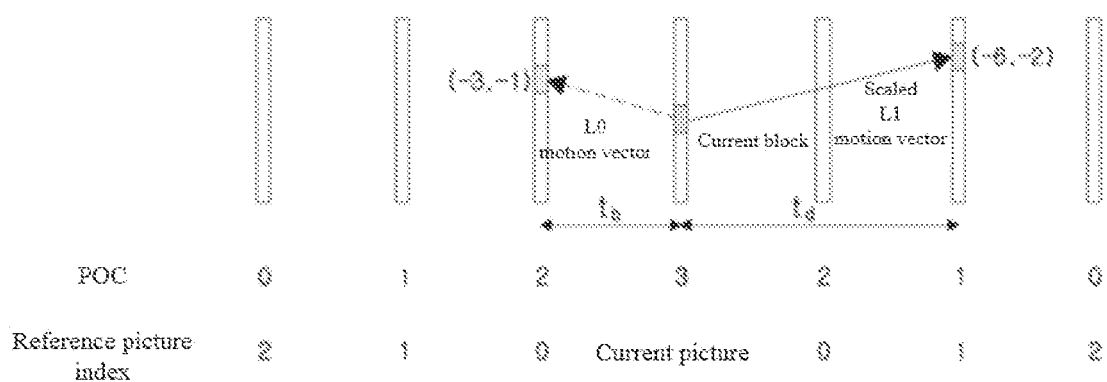
FIG. 15 is a diagram illustrating a method of scaling a motion vector.
FIG. 16 is a diagram illustrating a method of deriving an additional motion vector when a bi-directionally predictable block has a motion vector that belongs to only one of the lists L0 and L1.

FIG. 15 is a diagram illustrating a method of scaling a motion vector.

Referring to FIG. 15, except for a reference picture having the same POC as a reference picture indicated by the L0 motion vector among reference pictures in the L1 list, a picture having the least POC difference from the current picture is derived as an L1 reference picture. Next, an L0 motion vector that is scaled according to the POC difference between the L0 reference picture and the current picture and the POC difference between the derived L1 reference picture and the current picture is determined as the L1 direction motion vector.

Specifically, except for a reference picture POC2 indicated by the L0 motion vector, a picture POC1 having the least POC difference from the current picture is derived as the L1 reference picture. The L0 motion vector scaled by considering the POC difference tb between the L0 reference picture and the current picture and the POC difference td between the L1 reference picture and the current picture is derived as an L1 direction motion vector.

Hereinafter, the process of scaling a motion vector will be described in more detail.

The POC difference td means the value of a difference between the picture order count (POC) of the current picture and the picture order count (POC) of the L1 reference picture of the current block. The POC difference tb means the value of a difference between the POC of the current picture and the POC of the L0 reference picture of the current block.

The td value, the tb value, or both are adjusted so that the td value or the tb value is included in a range of from −128 to 127. When the td value or the tb value is less than −128, the td value or the tb value is adjusted to be −128. When the td value or the tb value is greater than 127, the td value or the tb value is adjusted to be 127. When the td value or the tb value is in a range of from −128 to 127, the td value or the tb value is not adjusted. That is, the tb value or the tb value may be clipped so that the tb value or the tb value falls within a predetermined value range.

In this case, a tx value is obtained by (16384 Abs (td/2))/td. Here, Abs ( ) represents an absolute value function, and the output value of the function is always the absolute value of an input value.

The scaling factor DistScaleFactor is obtained by (tb*tx+32)»6, and the scaling factor DistScaleFactor is adjusted to fall within a range of −1024 to 1023.

The scaled motion vector is obtained by Sign(DistScaleFactor*mv)*((Abs (DistScaleFactor*mv) 127)»8). At this time, sign( ) is a function of outputting sign information of a specific value. For example, sign(−1) outputs "−". In addition, mv represents a motion vector value that is not scaled.

FIG. 16 is a diagram illustrating a method of deriving an additional motion vector when there is a motion vector corresponding to only one of the L0 and L1 lists L0 in a bi-directionally predictable block.

When using merge candidates in a merge candidate list, when there is only one merge candidate corresponding to the L0 or L1 list although the current block is a bi-directionally predicable block, an additional motion vector is derived to construct a merge candidate list for a direction in which there is not motion vector.

Referring to FIG. 16, when a merge index information value is 2, only the L0 motion vector exists. In this case, the n-th available motion vector in the L1 list is used as the initial L1 motion vector of the current block. Here, n is a value set commonly in the encoder and the decoder, and is a positive integer including 1.

Figures 17, 18:
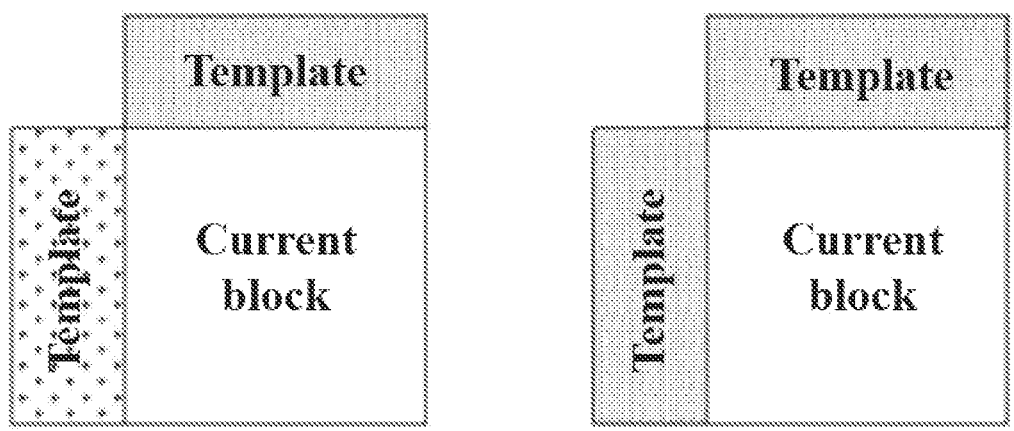
FIG. 17 is a diagram illustrating a method of selecting a merge candidate having bi-directional motion information, as an initial motion vector in a bi-directionally predictable block.
FIGS. 18 to 23 are diagrams illustrating a template to be used in some embodiments of the present invention.

FIG. 17 is a diagram illustrating an exemplary method of selecting a merge candidate having bi-directional motion information as an initial motion vector in a bi-directionally predictable block.

In the case of using a merge candidate in a merge candidate list, when the current block is a bi-directionally predicable block, a motion vector of a merge candidate having bi-directional motion information among the merge candidates in the merge candidate list is used as an initial motion vector. Here, when there are multiple candidates having bi-directional motion information, a candidate having the smallest merge index information is used for bi-prediction.

Referring to FIG. 17, when the current block is a bi-directionally predicable block, a motion vector corresponding to a merge candidate index of 3, which is the first available merge candidate motion vector having bi-directional motion information, is used.

When there is no reference picture satisfying the above-mentioned condition, the motion information of a merge candidate selected by the existing merge index information is derived as an initial motion vector.

On the other hand, when using a merge candidate in a merge candidate list, a motion vector of a merge candidate satisfying a specific condition is used as an initial motion vector. The specific condition means that 1) only either a first POC difference value (POCref0-POCcurr) or a second POC difference value (POCref1-POCcurr) has a negative value, in which the first POC difference value is the value of a POC difference (POCref0-POCcurr) between an encoding/decoding target picture and a first reference picture corresponding to a first prediction direction (for example, L0 prediction direction) among merge candidates having bi-prediction information, and the second POC difference value is the value of a POC difference (POCref1-POCcurr) between the encoding/decoding target picture and a second reference picture corresponding to a second prediction direction (for example, L1 prediction direction), and/or 2) a merge candidate in a merge candidate list exhibits a motion vector difference greater than a predetermined threshold value (for example, one integer-pixel) from each of the other merge candidates in the merge candidate list.

Here, the predetermined threshold value varies depending on the size of the current block or the number of pixels constituting the current block. For example, when the number of pixels constituting the current block is smaller than 64, one integer pixel value is used. On the other hand, when the number of pixels constituting the current block ranges from 64 to 256, 2 integer pixel values are used. When the number of pixels constituting the current block is 265, 4 integer pixel values are used.

On the other hand, the encoder or the decoder may not use a variable threshold value that is determined according to the size of the current block or the number of pixels, but may use a predetermined threshold value that is preset in the encoder or the decoder. Alternatively, the encoder or the decoder may derive and use a threshold value depending on the size of the current block or the number of pixels in the current block that is determined on the basis of a threshold value signaled to the decoder via a video parameter set, a sequence parameter set, a picture parameter set, an adaptation parameter set, a tile group header, a slice header, a tile, a CTU, a CU, or a block.

For example, when the predetermined threshold value MV_THR is 4 integer pixels, when an integer number of pixels (MV_THR (4)»2) is used when the number of pixels of the current block is smaller than 64. When the number of pixels of the current block ranges from 64 to 256, an integer number of pixels (MV_THR (4)»1) is used. When the number of pixels in the current block is larger than 256, an integer number of pixels (MV_THR (4)»0) is used.

On the other hand, when using a merge candidate in a merge candidate list, when a first POC difference value (POCref0-POCcurr) and a second POC difference value (POCref1-POCcur) have negative values, the motion information of a merge candidate satisfying conditions described below is used as initial motion information, in which the first POC difference value means the value of a POC difference between an encoding/decoding target picture and a first reference picture corresponding to a first prediction direction (for example, L0 prediction direction) among merge candidates having bi-direction motion information in the merge candidate list and the second POC difference value means the value of a POC difference between the encoding/decoding target block and a second reference picture corresponding to a second prediction direction (for example, L1 prediction direction).

Condition 1) POCref0 is not equal to POCref1.
Condition 2) Vertical and horizontal motion vectors of MVref0 and MVref1 are not zero Condition 3) $((MVx0 \times (POCref1 - POCcurr) - MVx1 \times (POCref0 - POCcurr)) == 0) \,\&\&\, ((MVy0 \times (POCref1 - POCcurr) - MVy1 \times POCref0 - POCcurr)) = 0)$ or $((MVx0 \times POCref1 - POCcurr) - MVx1 \times (POCref0 - POCcurr)) < TH) \,\&\&\, ((MVy0 \times (POCref1 - POCcurr)) - MVy1 \times (POCref0 - POCcurr)) < TH)$ MVx0, MVy0, MVx1, and MVy1 denote a horizontal motion vector of the first reference picture, a vertical motion vector of the first reference picture, a horizontal motion vector of the second reference picture, and a vertical motion vector of the second reference picture, respectively. TH denotes a threshold value that is a predetermined threshold value set in the encoder and decoder or a threshold value that is determined by the encoder and is signaled to the decoder via at least one of a predetermined video parameter set, a sequence parameter set, a picture parameter set, an adaptation parameter set, a slice header, a CTU, a CU, or a block.

When performing motion compensation of the current block on the basis of the initial motion vector derived by the above-described method, when the initial motion vector has a motion vector for each sub-pixel, the motion compensation is performed on the basis of a motion vector rounded to the nearest integer pixel position.

For example, when the motion vector has a motion vector precision of 1/16-pel, it is rounded to an integer pixel position by Equation 4. A shift value varies depending on the precision. For example, when the motion vector precision is 1/16-pel, the shift value is 4. When the motion vector precision is 1/8-pel, the shift value is 3.

$$\text{round } MV(x, y) = ((MV_x + (1 \ll \text{shift} - 1)) \gg \text{shift}) \ll \text{shift}, \quad [\text{Equation 4}]$$
$$((MV_y + (1 \ll \text{shift} - 1)) \gg \text{shift}) \ll \text{shift}$$

Next, the step S820 of deriving a refined motion vector by using a derived initial motion vector will be described in detail.

The encoder/decoder performs block-based motion vector refinement using a derived initial motion vector.

Regarding the motion vector refinement, the encoder or the decoder corrects the initial motion vector by using a spatial neighboring block and/or a temporal neighboring block of the current block. The reconstructed pixels in the spatial neighboring block and/or the temporal neighboring block to be used for the motion vector refinement are defined as a template. The reconstructed pixel means a filtered reconstructed neighboring sample that is in-loop filtered or an unfiltered reconstructed neighboring block that has not passed an in-loop filter such as a deblocking filter, a sample adaptive offset (SAO), or an adaptive loop filter (ALF).

For example, the encoder or the decoder constructs a template with spatial reconstructed spatial neighboring pixels of the current block, and corrects an initial motion vector using the template.

Constructing a template with the reconstructed pixels in a temporal neighboring block means that the template is composed of reconstructed or interpolated pixels in a reference picture indicated by motion information of an upper neighboring block of the current block and/or motion information of a left neighboring block of the current block.

FIGS. 18 to 21 are views illustrating a template according to an embodiment of the present invention.

As to the construction of a template, the encoder or the decoder may construct a template using pixels in an upper reconstructed neighboring block and/or a left reconstructed neighboring block as illustrated in FIG. 8.

Here, when there is a pixel which is not available among the pixels of the upper or left reconstructed neighboring block of the current block, the encoder or the decoder may construct a template only with the pixels of an available block.

Figure 19:
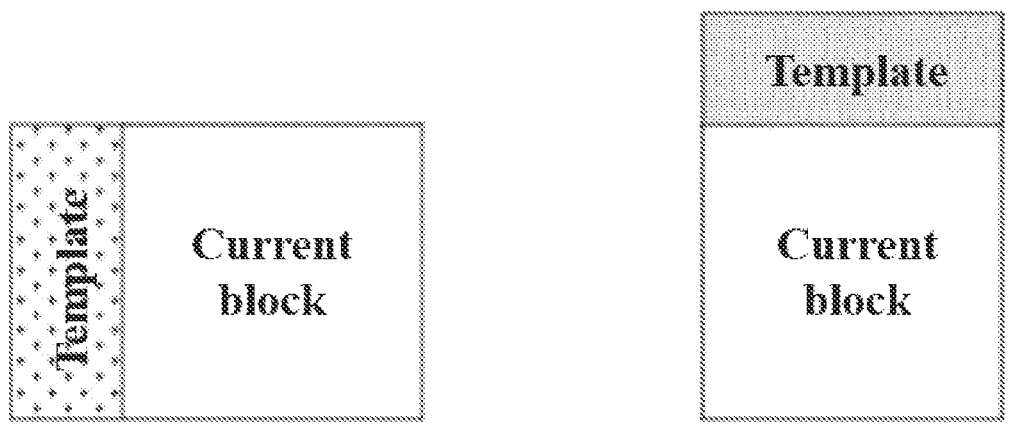

For example, as illustrated in FIG. 19, when the upper reconstructed neighboring block of the current block is not available because it is adjacent to a picture boundary, a slice boundary, a tile boundary, a tile group boundary, or a CTU boundary, the encoder or the decoder constructs a template composed only the pixels of the left reconstructed neighboring block. When the left neighbor restoration block of the current block is not available because it is adjacent to a picture boundary, a slice boundary, a tile boundary, a tile group boundary, or a CTU boundary, the encoder or the decoder constructs a template composed of the pixels of the upper reconstructed neighboring block.

For example, when the upper reconstructed neighboring block of the current block is not available because it is adjacent to a CTU boundary, and the pixels in the left reconstructed neighboring block are available, the encoder or the decoder constructs a left template using the left reconstructed neighboring pixels. In this case, the horizontal size of the left template is N+m, and the vertical size is the same as the vertical size of the current block. Where N is the size of the template sent to the decoder or a fixed template size, and m is an integer value including zero.

When constructing a template, when the neighboring blocks of the current block belong to the same motion estimation region as the current block, the encoder or the decoder determines that the blocks or templates corresponding to the positions are not available.

Figure 24:
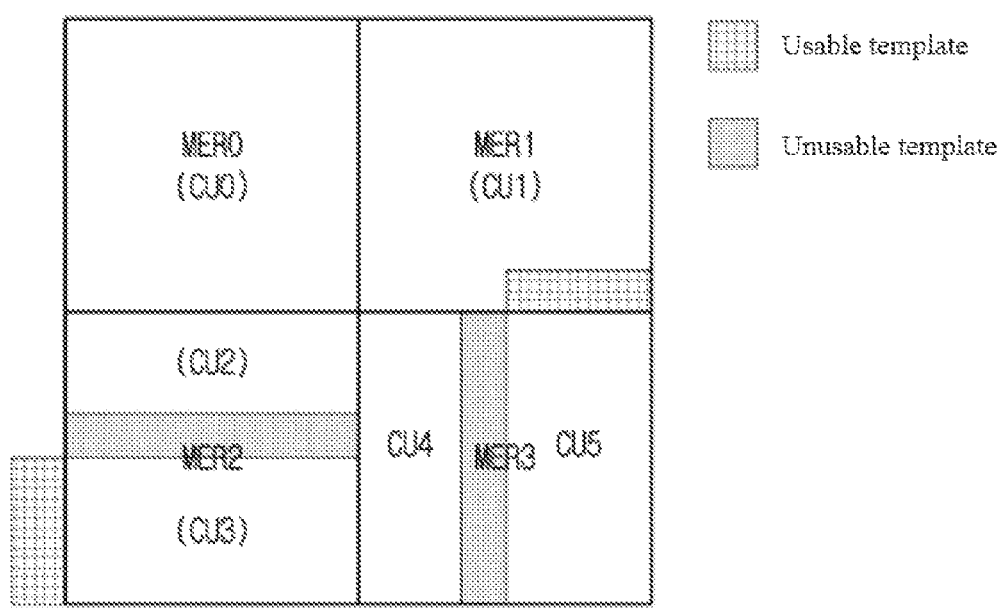
FIG. 24 is a diagram illustrating a template construction process in which a motion estimation region is taken into account.

FIG. 24 is a diagram illustrating a template construction process in which a motion estimation region is taken into account.

Referring to FIG. 24, the encoder or the decoder determines that an upper template is unavailable for a current block CU3 belonging to a motion estimation region 2 and a left template is unavailable for a current block CU5 belonging to a motion estimation region 3.

The motion estimation regions are generated by dividing a largest coding unit (LCU) by a quad tree partition structure in the same manner in the encoder and the decoder. In another example, the motion estimation regions are generated according to partition information that is signaled to the decoder when the encoder signals at least one of a video parameter set, a sequence parameter set, a picture parameter set, an adaptation parameter set, a tile group header, a slice header, and a tile to the decoder.

In a further example, the encoder or the decoder constructs a template using only the upper or left reconstructed neighboring block of the current block, regardless of the availability of the upper and left reconstructed neighboring blocks.

Figure 25:
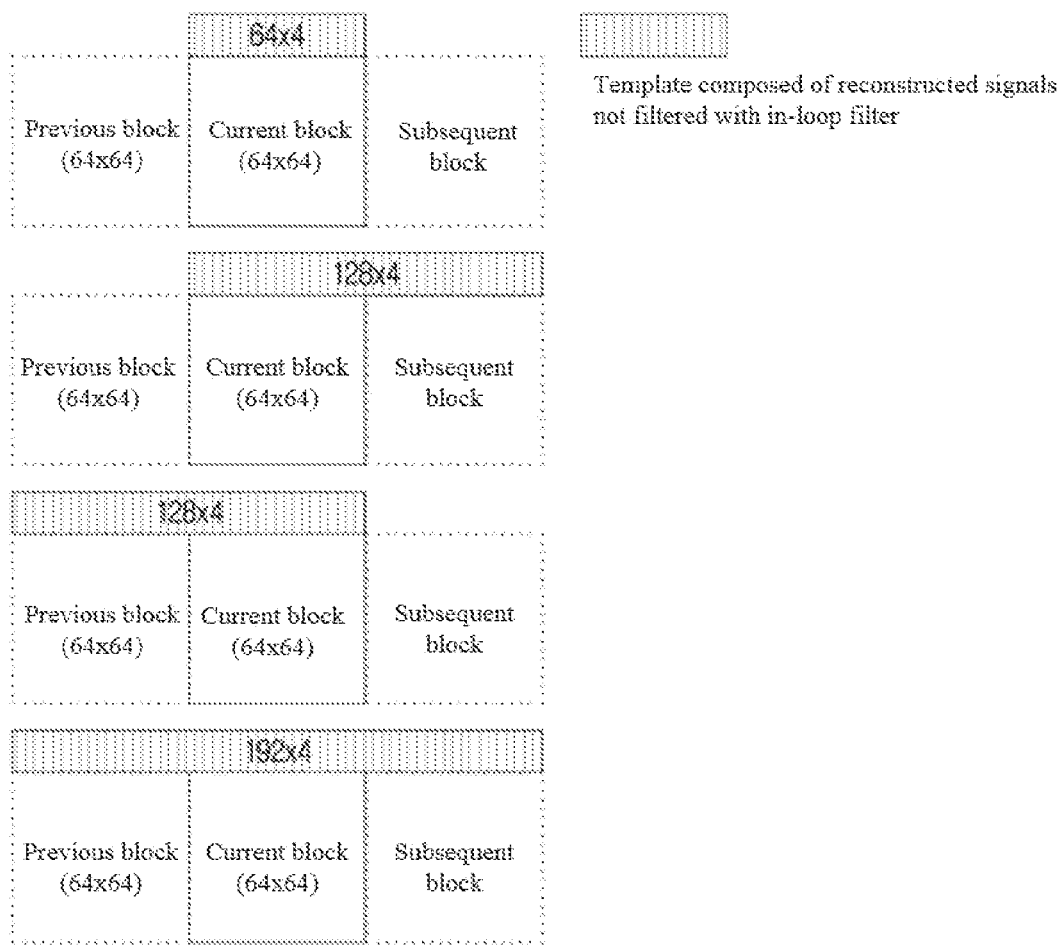
FIG. 25 is a diagram illustrating a template composed of reconstructed pixel values which are not filter by an in-loop filter.

FIG. 25 is a diagram illustrating a template constructed by using reconstructed pixel values that are not filtered by an in-loop filter.

As illustrated in FIG. 25, the encoder or the decoder constructs an upper template with reconstructed pixel values that are not filtered by an in-loop filter, such as a deblocking filter, a sample adaptive offset (SAO), and an adaptive loop filter, by using only the upper neighboring block of the current block for hardware pipelining. When a template is constructed using only the upper neighboring block as described above, the horizontal size of the template is larger than the horizontal size of the current block.

Further, when constructing a template, the encoder or the decoder constructs a template by replacing unavailable pixels with available pixels. Here, the available pixels include a neighboring pixel adjacent to the current block, a pixel derived by applying an interpolation filter to a neighboring pixel, or a pixel having a value predefined in the encoder and decoder. On the other hand, the template may be composed of predicted pixel values rather than reconstructed pixel values.

When constructing a template with predicted pixel values in a neighboring block adjacent to the current block, the template may be constructed by adding a reconstructed transform coefficient DC component to the predicted pixel values.

Figure 26:
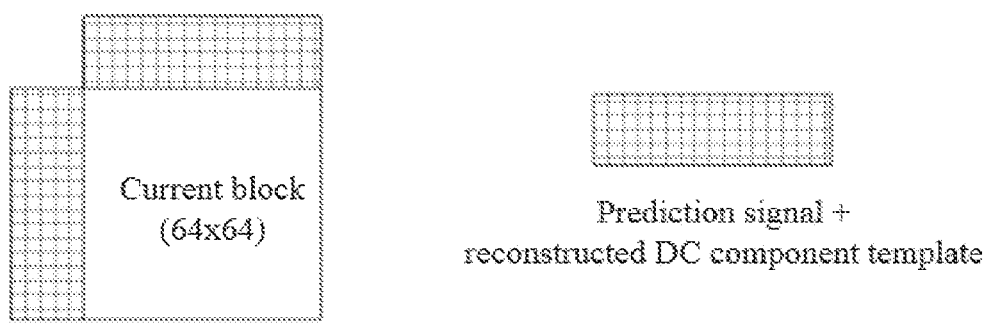
FIG. 26 is a diagram illustrating a template composed of predicted pixel values in a neighboring block and reconstructed transform coefficient DC component values.

FIG. 26 is a diagram illustrating a template composed of predicted pixel values in a neighboring block and reconstructed transform coefficient DC component values.

As illustrated in FIG. 26, the encoder or the decoder constructs a template of the current block by summing the predicted pixel values of a left neighboring block and the reconstructed transform coefficient DC components of the left neighboring block of the current block. When the encoder or the decoder constructs a template using only a left neighboring block, the vertical size of the template is larger than the vertical size of the current block.

When constructing a template, when a motion vector is a sub-pixel motion vector, the encoder or the decoder generates a pixel value at a corresponding position by applying an interpolation filter. Here, a bi-linear filter, an 8-tap DCT-IF filter, or the like is used as the interpolation filter. The encoder or the decoder determines information on an interpolation filter to be used to construct a template. Alternatively, the encoder or the decoder determines that a predetermined filter is used without transmitting information of the type of an interpolation filter. The information of the interpolation filter type is signaled via a bitstream.

On the other hand, the template has a size of M×N where M and N are positive integers.

Figure 20:
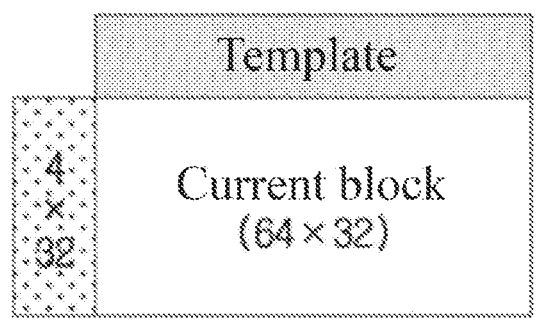

For example, as illustrated in FIG. 20, when the size ((width×length) of the current block is 64×32, and the pixel length of the template defined in the encoder and decoder is 4 pixels, the size of the upper template is 64×4, and the size of the left template is 4×32.

The pixel length depends on the motion vector precision. For example, when the motion vector precision is ¼-pixel and the block size is 16 pixels, the pixel length of the template is 4 pixels.

Figure 21:
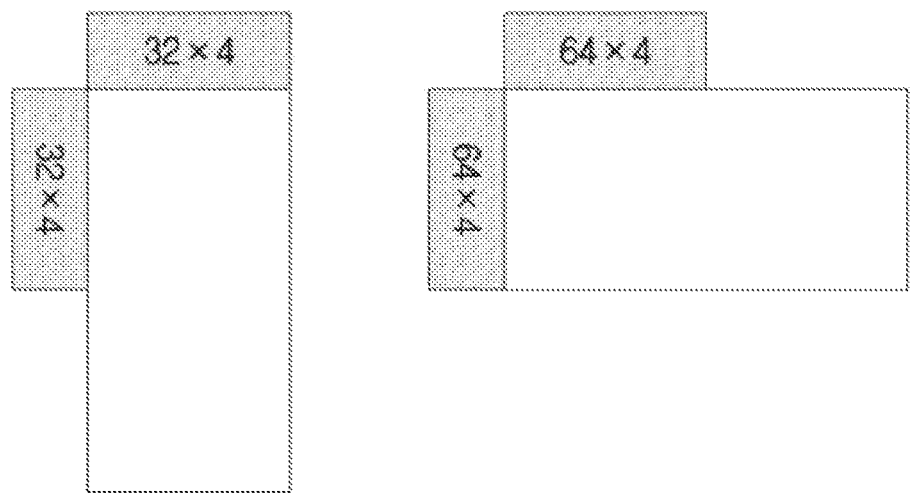
Figure 22:
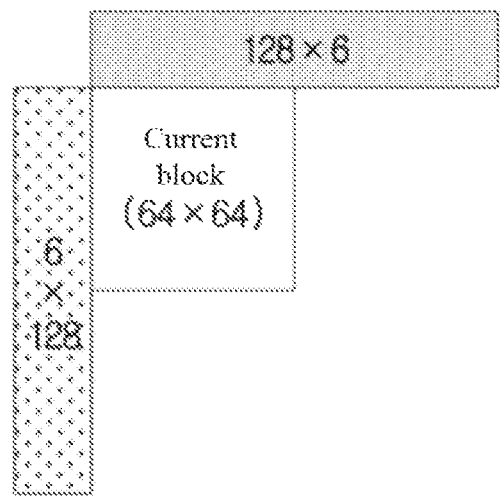
Figure 23:
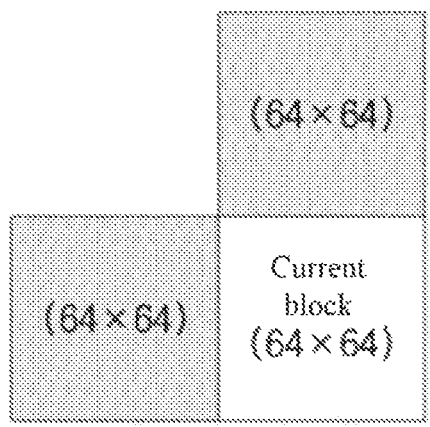

On the other hand, as illustrated in FIG. 21, when the width (horizontal size) of the current block differs from the height (vertical size) of the current block, the encoder or the decoder sets the template sizes such that the upper template and the left template have the same size.

When constructing a template, when the size of a template is M×N, M of an upper template has a value greater than the horizontal length of the current block and N of the upper template has a fixed pixel length defined by the encoder and the decoder. In addition, N of a right template has a value greater than the vertical length of the current block, and M of the right template has a fixed pixel length defined by the encoder and the decoder.

For example, when the size of the current block is 64×64 and the pixel length of the template defined by the encoder and the decoder is 6 pixels, the size of the upper template is 128×6 and the size of the left template is 6×128.

On the other hand, when constructing a template, the template has a size of M×N, and the size varies depending on the size or the depth of the current block.

For example, when the size of the current block is 128×64 and the horizontal or vertical length is greater than 32, the size of the upper template is 128×6 and the size of the left template is 6×64.

In addition, for example, when the size of the current block is 16×16 and the length is less than 32, the size of the upper template is 16×2 and the size of the left template is 2×16.

On the other hand, when constructing a template, the size of a template varies depending on the position indicated by a motion vector in a reference picture. Further, when constructing a template, the size of the template is determined on the basis of the maximum search area.

Here, the maximum search area refers to an area having a horizontal size that is equal to the sum of the horizontal size of a search area in a reference picture and +M and a vertical size that is equal to the sum of the vertical size of a search area in a reference picture and +N. Where N and M are positive integers and are the same value. The size information N and M of the maximum search area is set equally in the encoder and the decoder. Alternatively, the size information is determined by the encoder and is signaled to the decoder via a video parameter set, a sequence parameter set, a picture parameter set, an adaptation parameter set, a slice header, a CTU, a CU, or a block.

For example, the size of a template varies depending on whether or not a motion vector that has moved around an initial motion vector indicates the boundary of an upper maximum search area or a left search area.

For example, when the template size transmitted to the decoder or the predetermined fixed size defined by the encoder and decoder is N, and the motion vector indicates the boundary of the upper maximum search area, the size of the upper template located outside the search area is determined as the horizontal size (W×N−1) of the current block.

When the template size transmitted to the decoder or the predetermined fixed size defined by the encoder and decoder is N, and the motion vector indicates the boundary of the left search area, the size of the left template located outside the search area is determined as (N−1)×the vertical size H of the current block.

The template size is determined so as to reduce the memory access bandwidth.

Figure 27:
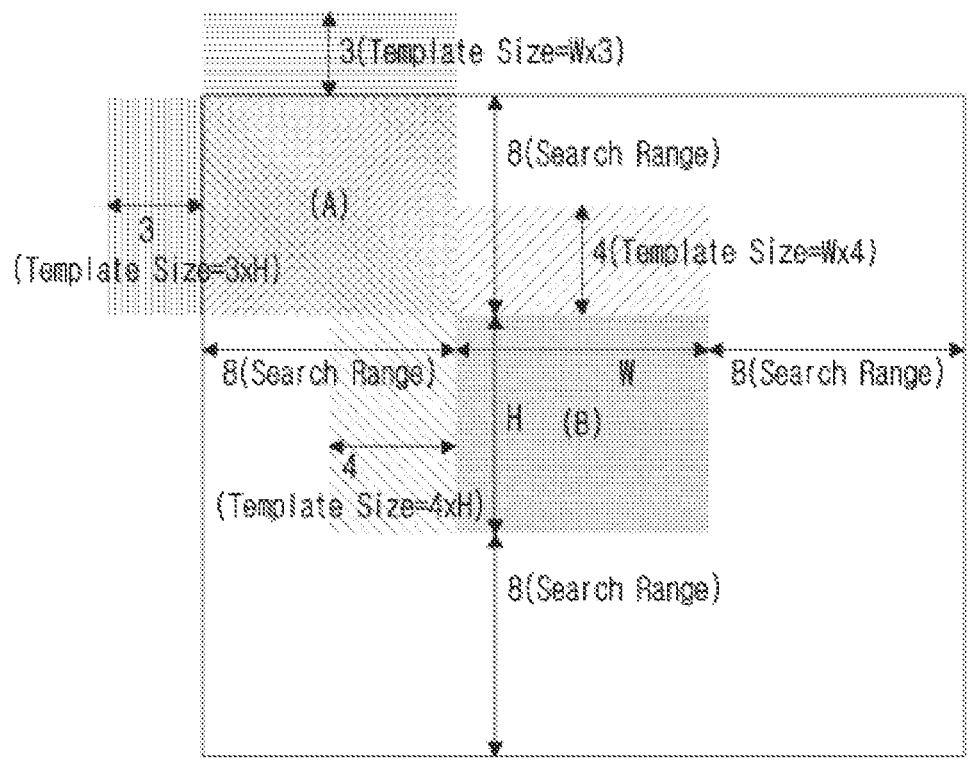
FIG. 27 is a diagram illustrating an example of a template size.

FIG. 27 is a diagram illustrating an example of a template size.

As illustrated in FIG. 27, when the template size is 4 (=N) and the motion vector indicates the boundary of the upper maximum search area and the boundary of the left search area (case A), the size of the upper template is determined as W×3 and the size of the left template is determined as 3×H. The sizes of the upper template and the left template within other search areas B is determined as W×4 and 4×H.

On the other hand, when constructing a template, the interpolation method that is used to construct the template varies depending on the position indicated by a motion vector in a reference picture.

For example, the interpolation method used to construct a template varies depending on whether or not a sub-block position motion vector that has moved in a direction from the initial motion vector indicates the boundary of the upper maximum search area or the left maximum search area. The reason why the interpolation method varies is to reduce the memory access bandwidth.

FIGS. 28 to 31 are diagrams illustrating an interpolation-based template construction method according to various embodiments of the present invention.

Figure 28:
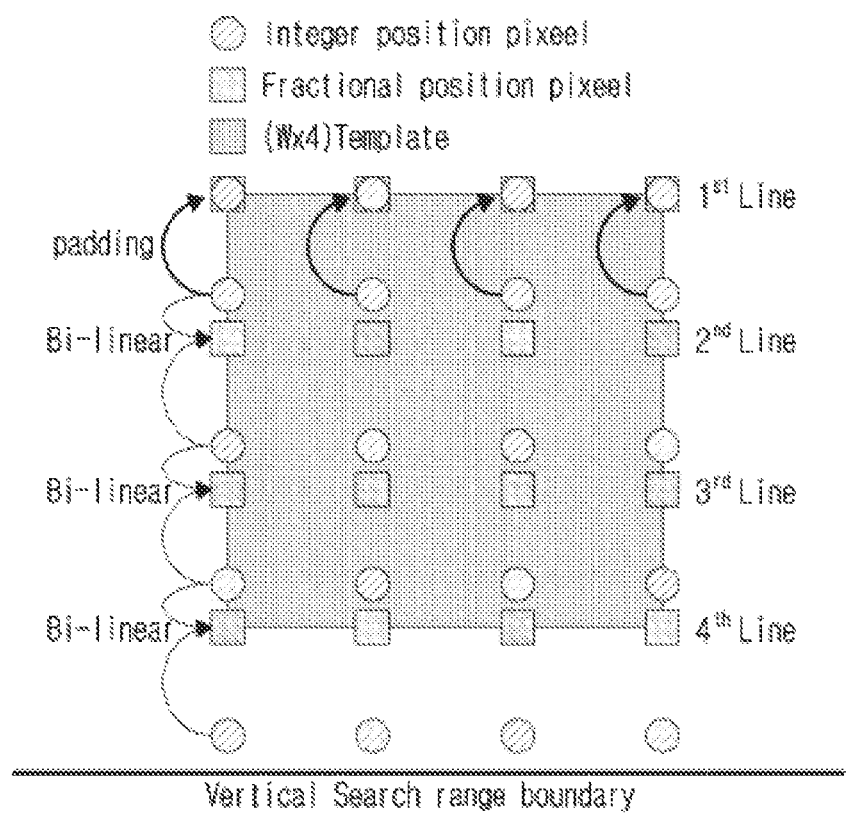
FIGS. 28 to 31 are diagrams illustrating an interpolation-based template construction method according to various embodiments of the present invention.

For example, as illustrated in FIG. 28, when the size of a template is W×4 and a motion vector indicates an upper maximum search area, the encoder or the decoder does not perform an interpolation process on pixel values in the first line of the template but uses pixel values at integer pixel positions downward closest to sub-pixel positions. On the other hand, the encoder or the decoder may use pixel values generated by performing bi-linear interpolation on integer pixels as the pixel values positioned in the second, third, and fourth lines.

Figure 29:
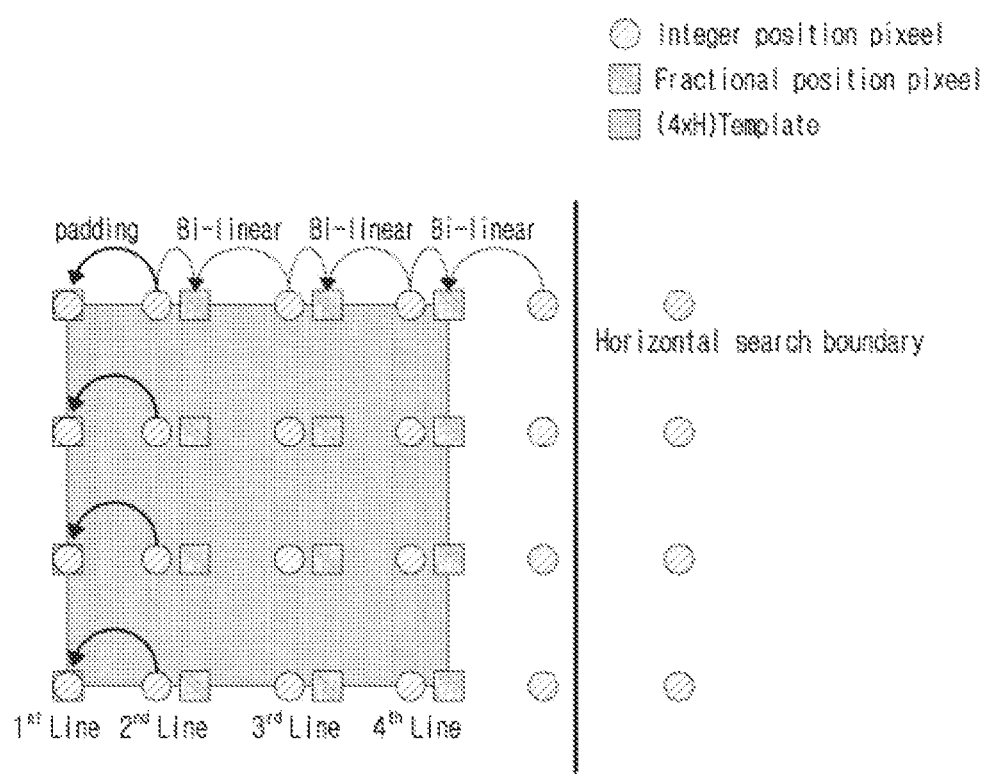

In addition, for example, as illustrated in FIG. 29, when a template has a horizontal/vertical size of 4×H and a motion vector indicates the left maximum search area, the encoder or the decoder does not perform interpolation on the pixel values in the first line of the template but uses the pixel values at left closest integer pixel positions. On the other hand, the encoder or the decoder may uses pixel values generated by performing bi-linear interpolation on integer pixels in the second, third, and fourth lines.

Figure 30:
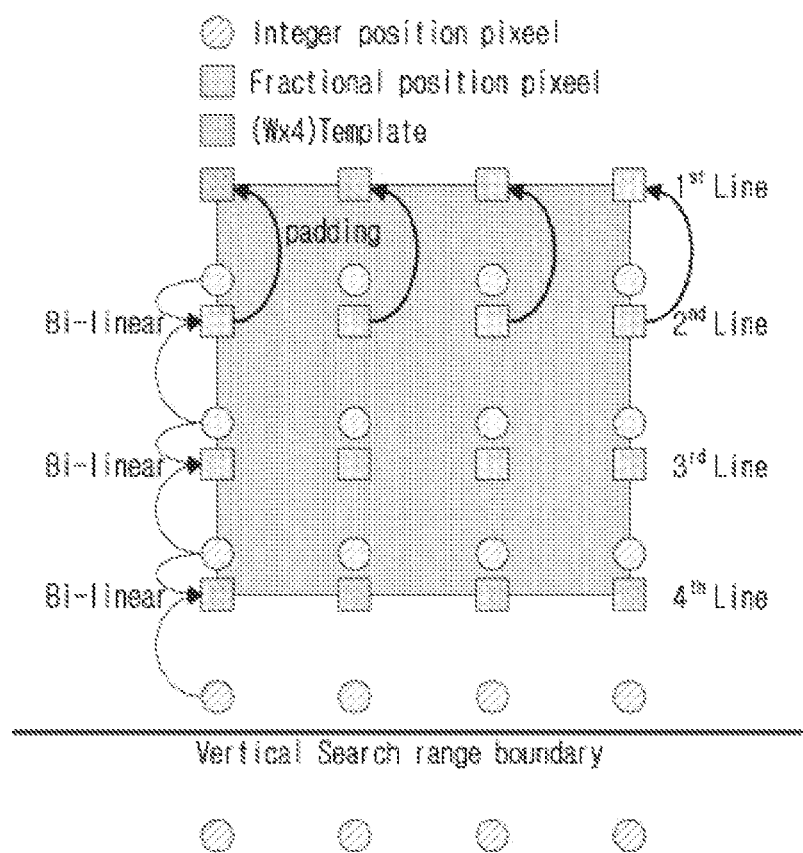
Figure 31:
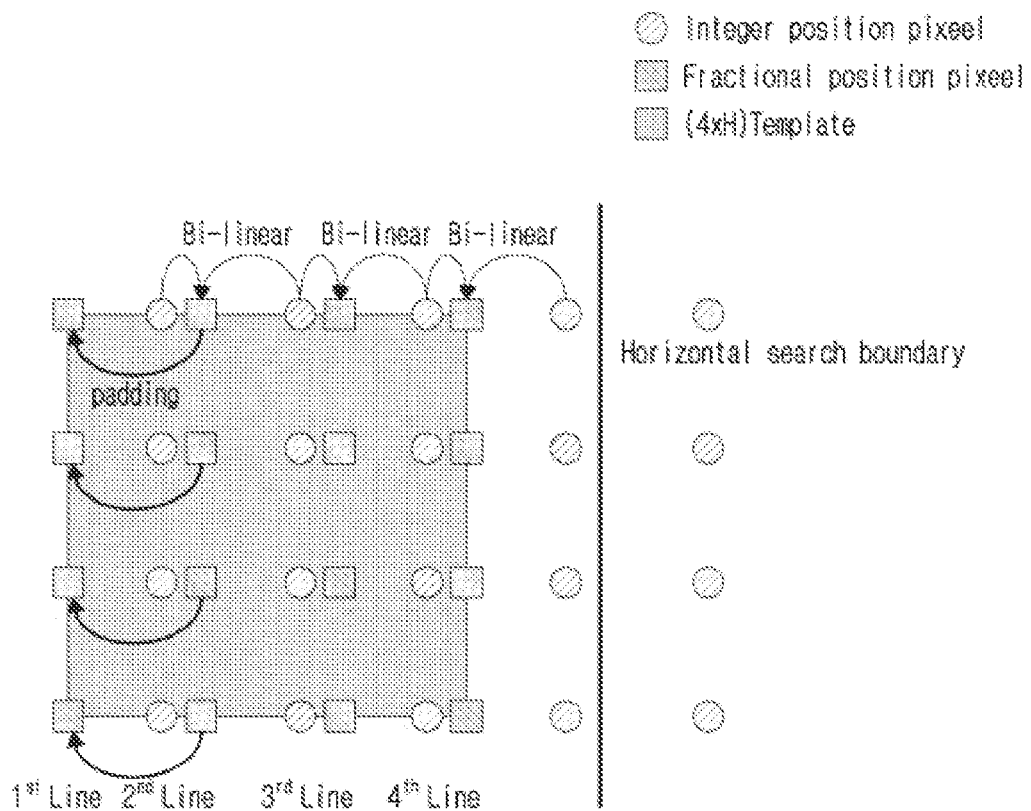

In addition, for example, as illustrated in FIG. 30, when the size of a template is W×4 and a motion vector indicates a boundary of an upper maximum search area, the encoder or the decoder copies and uses pixel values in the N-th line, which are generated by performing bi-linear interpolation on pixel values in the first line of the template.

In addition, for example, when the size of a template is 4×H and a motion vector indicates a position in a left maximum search area, the encoder or the decoder copies and uses pixel values in the N-th line generated by performing bi-linear interpolation on pixel values in the first line of the template.

On the other hand, the template size information required for construction of a template is signaled via a bitstream.

Figure 32:
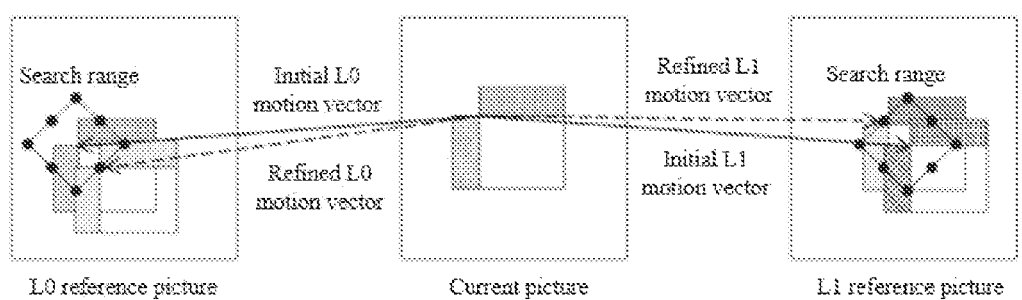
FIG. 32 is a diagram illustrating a method of refining an initial motion vector using a template.

FIG. 32 is a diagram illustrating a method of refining an initial motion vector using a template.

Referring to FIG. 32, the encoder or the decoder searches for a motion vector indicating a template that minimizes an error with a neighboring template of the current block in a search area in a reference picture indicated by an initial motion vector, and determines the motion vector as a refined motion vector.

In this case, a template in a reference picture is generated from a predetermined search area including a pixel position indicated by the initial motion vector.

The predetermined search area has a cross shape, a square shape, a diamond shape, a rhombus shape, a hexagon shape, or the like in which a pixel position indicated by the initial motion vector is included, according to a search method. On the other hand, the process of minimizing an error between a template in a reference picture and a neighboring template of the current block means a process of minimizing a difference between the template in the reference picture and the neighboring template of the current block.

In calculating an error between a template in a reference picture and a template of the current block, the error is calculated on the basis of a distortion value, a cost value for a motion vector, or both.

For example, when both the left and upper templates are available, the cost value is calculated according to Equation 5.

$$\text{Cost value} = (\text{distortion value between left templates} + \text{distortion value between upper templates}) + (\text{initial motion vector } (x, y) - \text{refined motion vector}(x, y)) * \text{weight} \quad \text{[Equation 5]}$$

In another example, when only the upper template is available, the cost value is calculated according to Equation 6.

$$\text{Cost value} = \text{distortion value between upper templates} + (\text{initial motion vector}(x, y) - \text{refined motion vector } (x, y)) * \text{weight} \quad \text{[Equation 6]}$$

Here, the weight is a negative number smaller than 0, and a positive number larger than 0.

In addition, the distortion value is calculated using at least one of a SAD and an MR-SAD between templates. The values of the SAD and MR-SAD are calculated according to Equation 7.

$$SAD = \sum_{i,j} |Ctp(i, j) - Ltp(i, j)|;$$ [Equation 7]

$$MR\text{-}SAD = \sum_{i,j} |Ctp(i, j) - Ltp(i, j) - \text{delta } DC|;$$

Here, Ctp (i, j) is a pixel value in a left or upper template of a current block, Ltp (i, j) is a pixel value in a left or upper template in a reference picture, deltaDC is a value obtained by subtracting an average pixel value of the left template in the the reference picture from an average pixel value of the left template of the current block or a value obtained by subtracting an average pixel value of the upper template in the reference picture from an average pixel value of the upper template of the current block.

For example, whether to use the SAD or the MR-SAD is determined according to the size of the current block. For example, when the horizontal or vertical size of a block is greater than 64 pixels, the MR-SAD is used; otherwise, the SAD is used.

When comparing template sample values between the current block and the reference picture, the distortion value is calculated by performing an exclusive OR (XOR) operation on the template sample values. For example, an exclusive OR operation is performed on at least one of the template samples of the current block and the template samples of the reference picture, and then the sum of the exclusive OR operation results of the respective template samples is used to calculate the distortion value.

The encoder or the decoder calculates the distortion value after reducing the bit depth of each sample by a predetermined value K when comparing template sample values between the current block and the reference picture. In this case, K has a value of 0 to the bit depth value of the sample, and it is a positive integer or zero. For example, when the bit depth of the template samples of the current block and the bit depth of the template samples of the reference picture are 10 bits, the encoder or the decoder reduces the bit depth of the template samples of the current block and the bit depth of the template samples of the reference picture by 4 bits, and calculates the distortion value using an inter-sample distortion calculation method such as SAD, SATD, SSE, or MSE.

In addition, when comparing the template samples values between the current block and the reference picture, an inter-sample distortion calculation method and a rate calculation method of calculating a rate included in motion information are used. Thus, the position of a reconstructed sample in a reference picture, which exhibits the minimum rate-distortion value is used as a refined motion vector.

Here, the rate is calculated by performing entropy-encoding on at least one of the initial motion vector value and the refined motion vector value. The rate can also be calculated by performing entropy-encoding on the difference between the initial motion vector value and the refined motion vector value. The entropy-encoding means at least one of the above binarization methods.

Figure 33:
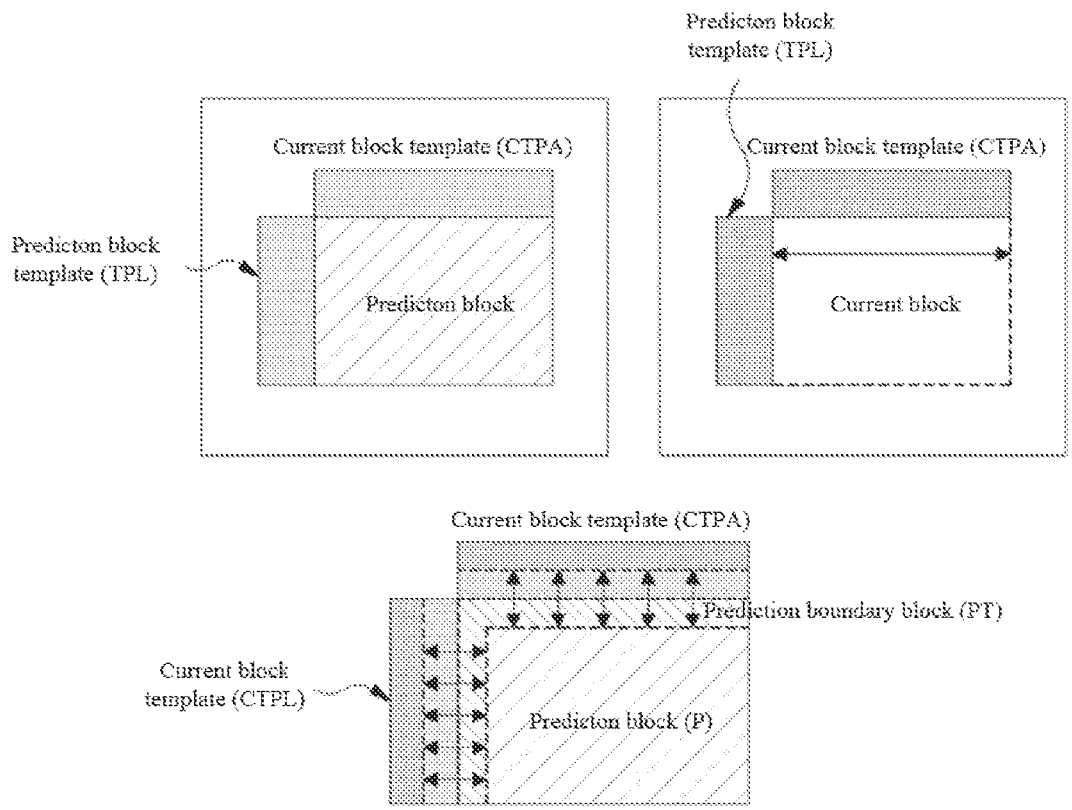
FIG. 33 is a diagram illustrating a distortion cost calculation method based on a distortion cost.

The distortion value is calculated by taking into consideration not only an error between a template in a reference picture and a template of the current block but also an error between a template of the current block and a prediction block generated from a refined motion vector position in a search area. FIG. 33 is a diagram illustrating a distortion cost calculation method based on a distortion cost.

As illustrated in FIG. 33, the encoder or the decoder can calculate a distortion value by taking into consideration not only a distortion value between a template of the current block and a prediction block but also a boundary pixel distortion value between a template of the current block and a prediction block generated from a reference picture. For example, the distortion value is calculated according to Equation 8.

Distortion value = $W0 \times$ (inter-template distortion value) [Equation 8]

$W1 *$ (distortion value for the current block template and prediction block boundary)

Here, the weights W0 and W1 are fixed values or variable values. The weights applied to the respective prediction blocks are equal to each other or different from each other. In order to apply a variable weight, one or more weight information for a decoding target block is signaled via a bitstream. The weight information is signaled for each prediction block, or for each reference picture. Multiple prediction blocks may share weight information.

The encoder or the decoder searches for a new motion vector nMV indicating a template that exhibits the minimum error with a template of the current block in a predetermined search area centered at a pixel position indicated by the refined motion vector rMV found on the basis of the initial motion vector.

Here, when the error between the template of the reference picture obtained by using the new motion vector (nMV) and the template of the current block is larger than the error between the template of the reference picture obtained from the previous refined motion vector (rMV) and the template of the current block template, the encoder or the decoder stops the refinement process.

However, when the error between the template of the reference picture obtained from the new motion vector (nMV) and the template of the current block is smaller than the error between the template of the reference picture obtained from the previous refined motion vector (rMV) and the current block template, the encoder or the decoder continuously performs the refinement by searching for a new motion vector in a search area centered at a pixel position indicated by the new motion vector nMV.

On the other hand, when the error between the template of the reference picture obtained from the new motion vector (nMV) and the template of the current block is smaller than the error between the template of the reference picture obtained from the previous refined motion vector (rMV) and the current block template, the encoder or the decoder iteratively searches for a new motion vector. In this case, the number of the searches for a new motion vector is limited by the motion refinement execution frequency information which means the number of times that motion refinement is performed.

For example, when the motion refinement execution frequency information is 2, the number of searches for a new motion vector is limited to two times in total. The motion refinement execution frequency information is inserted into a bitstream so as to be signaled. On the other hand, the motion refinement execution frequency information may be set to a predetermined number which is the same in the encoder and the decoder.

On the other hand, when the initial motion vector has motion vectors (for example, an L0 motion vector and an L1 motion vector) corresponding to N prediction directions, refined motion vectors for the respective prediction directions are obtained.

The predetermined search area is determined by the search area information. Here, the search area information required for determination of the search area is inserted into a bitstream so as to be signaled to the decoder from the encoder.

For example, the size of a predetermined search area varies depending on a coding parameter such as a picture type, a temporal layer, and a block size. For example, a search area in a picture corresponding to the highest layer has a size of a 1 integer pixel, and a search area in a picture corresponding to the layers below the highest layer may have a size of 8 integer pixels.

As to the search area set for searching for a refined motion vector, the pixel range in a horizontal direction and the pixel range in a vertical direction may be different from each other. For example, the pixel range in the vertical direction may be smaller than the pixel range in the horizontal direction. The reason why the pixel range is set to be difference between the horizontal direction and the vertical direction is because it is possible to reduce the memory access bandwidth.

Figure 34:
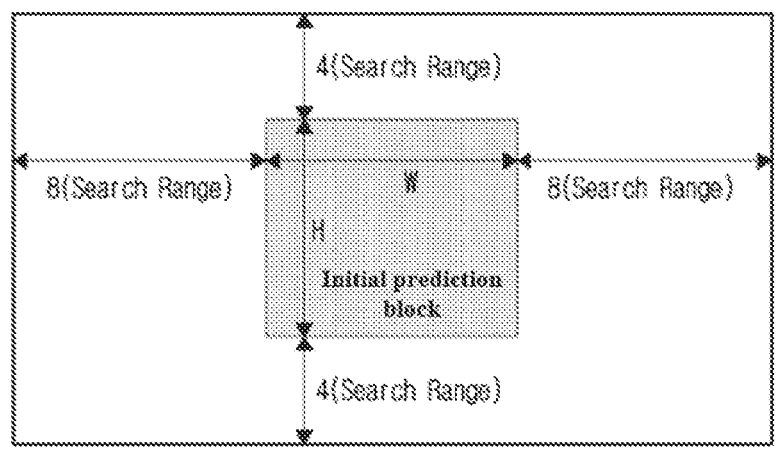

FIG. 34 is a diagram illustrating a search area range in which a refined motion vector is searched for.

As illustrated in FIG. 34, the size of an integer pixel-based search area in a horizontal direction is set to 8 pixels, and the size of an integer pixel-based search area in a vertical direction is set to 4 pixels. When a search area is set as described above, the difference between a horizontal component of an initial motion vector and a horizontal component of a refined motion vector is 8 or less. The difference between a vertical component of an initial motion vector and a horizontal component of a refined motion vector has a value of 4 or less. When the motion vector has a 1/16 motion vector precision, the difference between a horizontal component is 128 or less, and the difference between a vertical component is 64 or less.

The encoder or the decoder searches for a refined motion vector while changing the unit magnitude of a motion vector offset by which the initial motion vector can move within a predetermined search area.

The encoder or the decoder searches for a refined motion vector by changing the unit magnitude of a motion vector offset for refinement of a motion vector from an integer pixel magnitude to a sub-pixel magnitude.

For example, the encoder or the decoder sequentially searches for a refined motion vector starting from an integer pixel magnitude offset unit while sequentially changing an offset magnitude unit to (integer pixel magnitude)/(2×n). Here, n is a positive integer and it is a value that is preset in the encoder and the decoder or a value signaled to the decoder from the encoder.

Figure 35:
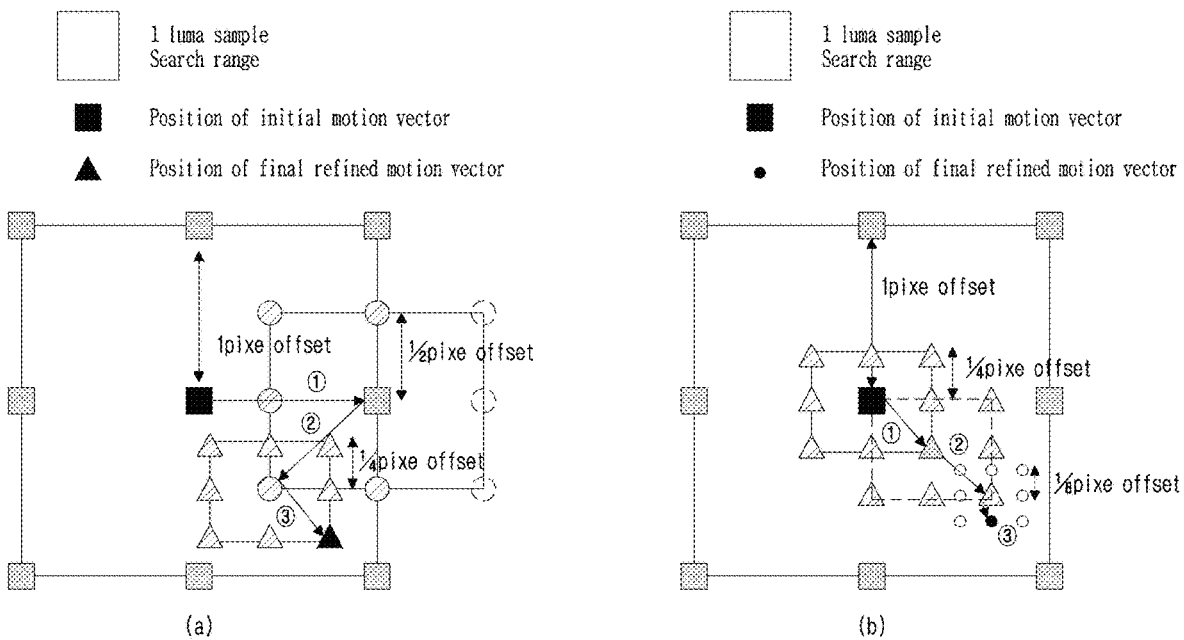
FIG. 35 is a diagram illustrating a method of searching for a motion vector by changing the unit magnitude of a motion vector offset.

FIG. 35 is a diagram illustrating a method of searching for a motion vector by changing the unit magnitude of a motion vector offset.

As illustrated in FIG. 35A, when the magnitude of a search area in a horizontal/vertical direction is a 1 pixel (integer pixel) and a square-shaped search method is used, the encoder or the decoder compares matching costs of 8 motion vector candidates having an 1-pixel offset, within a region the initial motion vector, to find a motion vector candidate having the minimum matching cost.

In addition, the encoder or the decoder compares the matching costs of 8 motion vector candidates having a ½-pixel offset, within a region around the motion vector having the minimum matching cost calculated on a per 1-pixel offset, to find a ½-pixel motion vector candidate having the minimum matching cost.

In this case, when the encoder or the decoder searches for a motion vector candidate, a magnitude difference between the initial motion vector and the moved motion vector having a ½-pixel offset for each component is greater than 1, the motion vector is not used. In addition, after searching for an optimal refined motion vector based on a ½-pixel offset, the encoder or the decoder searches for a motion vector candidate on a per ¼-pixel offset basis, within a region around the optimal refined motion vector based on the ½-pixel offset.

The encoder or the decoder searches for a refined motion vector while changing the unit magnitude of the motion vector offset, from a larger sub-pixel to a smaller sub-pixel.

For example, the encoder or the decoder sequentially searches for a refined motion vector on a per sub-pixel basis, starting from a sub-pixel-magnitude offset and sequentially moving to a magnitude of (sub-pixel-magnitude offset)/(2xm). Here, m is a positive integer, and m and the unit magnitude of a sub-pixel offset from which the search is started are predetermined values preset in the encoder and decoder, or values signaled to the decoder from the encoder.

As illustrated in FIG. 35B, when the magnitude of an integer pixel-based search area in a horizontal/vertical direction is one pixel, and a square search method is used, the encoder or the decoder compares 8 motion vector candidates having a ¼-pixel offset in a region around the initial motion vector to find a refinement motion vector having the minimum matching cost.

In addition, the encoder or the decoder searches for a refined motion vector candidate having the minimum matching cost by comparing the matching costs of 8 motion vectors having a ¼-pixel offset with respect to the previous refined motion vector to find a refined motion vector having the minimum matching cost.

Next, the encoder or the decoder compares the matching costs of eight motion vector candidates having a ⅛-pixel offset in a region around the motion vector having the minimum matching cost based on a ¼-pixel offset, to find a motion vector candidate for a ⅛-pixel offset.

Information indicating the total number of searches in the search area and/or the number of searches in each offset magnitude unit includes a video parameter set, a sequence parameter set, a picture parameter set, an adaptation parameter set, a tile group header, a slice header, a tile, a CTU, and a block, and is entropy-encoded/decoded.

The information indicating the total number of searches in the search area and/or the number of searches in each offset magnitude unit are set to the same value in the encoder and the decoder.

When setting the size of a search area, the encoder or the decoder considers the precision of the motion vector. For example, when the motion vector precision is 1/16 and the size of an integer pixel-based search area in a horizontal/vertical direction is 1 pixel, it means that the size of a search area based on a sub-pixel is 16.

The motion search pattern (method) in a predetermined search area varies depending on the magnitude of a motion vector offset. For example, the encoder or the decoder uses a square search method for an integer pixel offset, a diamond shape search method for a ½-pixel offset, and a cross search method for a ¼-pixel offset.

The encoder or the decoder compares the matching costs for all the integer pixel positions and all the sub-pixel positions in a predetermined search area centered on the initial motion vector and determines a motion vector at the position producing the minimum matching cost as a refined motion vector.

Information of whether or not to search for a refined motion vector based on an integer pixel offset is signaled at least one level selected from among a video parameter set, a sequence parameter set, a picture parameter set, an adaptation parameter set, a tile group header, a slice header, a tile, a CTU, and a block and is entropy-encoded/decoded.

Whether to search for a motion vector on a per integer pixel basis in the encoder or the decoder is determined on the basis of the information of whether or not a motion vector is refined on a per integer pixel basis.

The information of whether a motion vector is refined on a per sub-pixel basis is signaled at one or more levels selected from among a video parameter set, a sequence parameter set, a picture parameter set, an adaptation parameter set, a tile group header, a slice header, a tile, a CTU, and a block and is entropy-encoded/decoded.

The encoder or the decoder determines whether to search for a motion vector for each sub-pixel according to the refined motion vector search information for each sub-pixel-magnitude offset.

Information of at least one of a pixel range of a search area for an integer pixel offset-based refined motion vector and a sub-pixel range of a search area for a sub-pixel offset-based refined motion vector is signaled at one or more levels selected from among a video parameter set, a sequence parameter set, a picture parameter set, an adaptation parameter set, a tile group header, a slice header, a tile, a CTU, and a block and is entropy-encoded/decoded. The encoder or the decoder corrects a motion vector in the same manner using the integer pixel range information and the sub-pixel range information.

The maximum pixel range of a search area for an integer pixel offset-based refined motion vector and the maximum sub-pixel range of a search area for a sub-pixel offset-based refined motion vector are set in the same manner in the encoder and the decoder.

In this case, at least one of the information of the difference with the maximum pixel range and the information of the difference with the maximum sub-pixel range are signaled at one or more levels selected from among a video parameter set, a sequence parameter set, a picture parameter set, an adaption parameter set, a tile group header, a slice header, a tile, a CTU, and a block and is entropy-encoded/decoded. The encoder and the decoder similarly correct a motion vector using the maximum pixel range information, the information of the difference with the maximum pixel range, or both. In addition, the encoder and the decoder correct a motion vector using the maximum sub-pixel range information, the information of the difference with the maximum sub-pixel range, or both.

The encoder or the decoder entropy-encodes/decodes the sub-pixel magnitude information on the basis of the information of whether a refined motion vector is searched on a per sub-pixel offset basis. In this case, the unit magnitude of the sub-pixel offset means at least one of ½-pixel, ¼-pixel, ⅛-pixel, ¹⁄₁₆-pixel, and ¹⁄₃₂-pixel. The encoder and the decoder similarly correct a motion vector using the sub-pixel unit information.

Further, multiple pieces of the sub-pixel unit information are entropy-encoded/decoded. When multiple pieces of the sub-pixel magnitude information are entropy-encoded/decoded, the encoder or the decoder corrects a motion vector for each sub-pixel offset corresponding to a coding unit's information.

Figure 36:
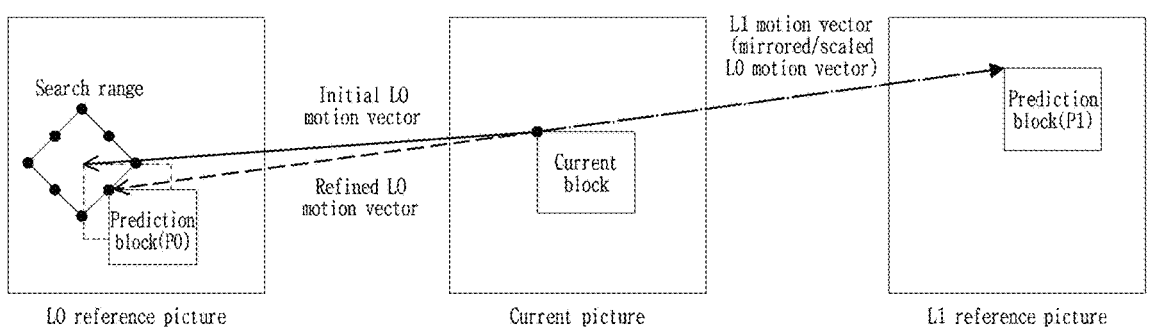
FIGS. 36 to 38 are diagrams illustrating a method of refining an initial motion vector.
Figure 37:
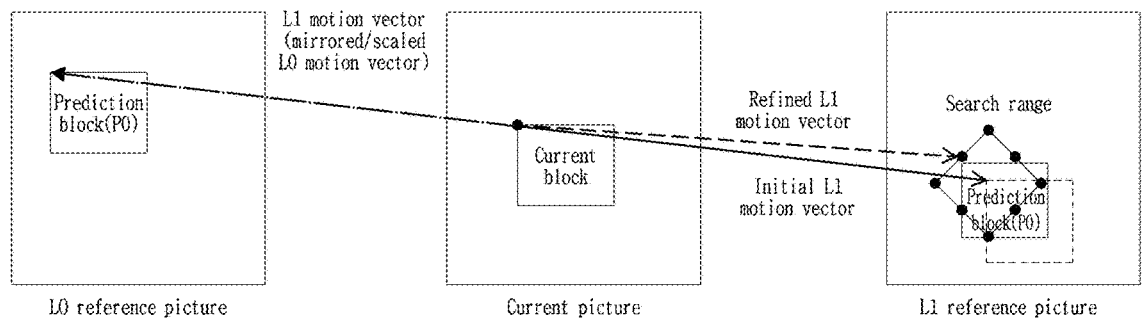
Figure 38:
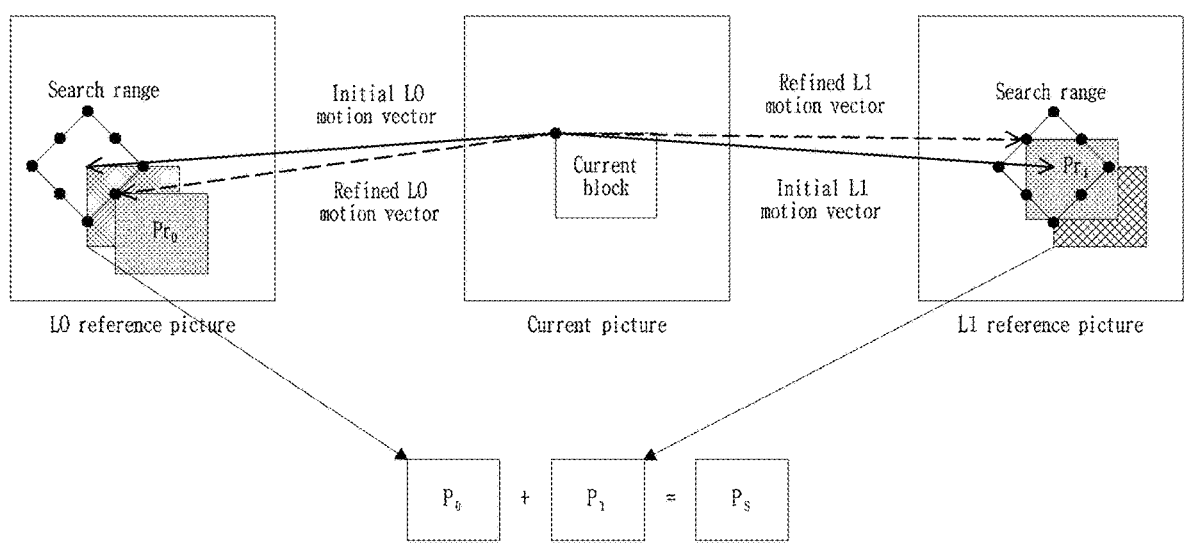

FIGS. 36 to 38 are diagrams illustrating a method of refining an initial motion vector.

The encoder or the decoder performs refinement on an initial motion vector using the merge mode-based motion vector refinement process or the prediction block-based motion vector refinement method.

Here, the encoder or the decoder performs refinement on an initial motion vector using refined motion vector parameters signaled from the encoder without using the template described above, or performs refinement on an initial motion vector using prediction blocks of the current block, which are generated by using motion vectors.

When performing motion refinement using prediction blocks (i.e., in the case of the prediction block-based motion vector refinement), a motion vector refinement is performed on the basis of the difference between prediction blocks in each reference picture indicated by the initial motion vector.

The motion refinement using the prediction blocks according to the present invention uses bilateral template matching.

In this case, a flag indicating whether or not the prediction block-based motion vector refinement can be performed is defined, and the flag is inserted into a video parameter set, a sequence parameter set, a picture parameter set, an adaptation parameter set, a tile group header, a slice header, a tile, a CTU, a CU, or a block so as to be signaled to the decoder.

The encoder or the decoder determines whether to perform motion vector refinement on the current block depending on a coding parameter value of the current block.

For example, the motion vector refinement may be performed when the current block is in merge mode.

Alternatively, the motion vector refinement may be performed when the current block is encoded/decoded by bi-directional prediction.

Further alternatively, whether to perform the motion vector refinement is determined whether or not a first POC difference (POC_curr-POC_ref0) is equal to a second POC difference (POC_ref1-POC_curr), in which the first POC difference means a POC difference between an encoding/decoding target picture and a first reference picture corresponding to a first prediction direction (e.g., L0 prediction direction) and the second POC difference means a POC difference between the encoding/decoding target picture and a second reference picture corresponding to a second prediction direction (e.g., L1 prediction direction).

Yet further alternatively, whether to perform the motion vector refinement is determined depending on the size of the current block. For example, when the vertical size of the current block is 8 or more, it is determined to perform the motion vector refinement. For example, when the area of the current block is 64 or more, it can be determined to perform the motion vector refinement.

For example, when the weight information of the prediction blocks of the current block is ½, it is determined to perform the motion vector refinement.

For example, whether to perform the motion vector refinement is determined depending the result of the comparison between a predetermined threshold value and a difference signal between prediction blocks in each reference picture indicated by the initial motion vector. The predetermined threshold value refers to a reference value used to determine whether to perform the motion vector refinement by determining the precision of the difference signal. Here, the predetermined threshold value is represented by at least one of a minimum value and a maximum value. For example, the predetermined threshold value is a fixed value preset in the encoder and the decoder. Alternatively, the predetermined threshold value is a value determined by a coding parameter such as a size, a type, and a bit depth of a current block, or a value signaled at a level of an SPS, a PPS, a slice header, a tile, a tile group header, a CTU, or a CU.

When the SAD value between the prediction blocks in each reference picture indicated by the initial motion vector is smaller than the predetermined threshold value, the encoder or the decoder do not perform the motion vector refinement. For example, the predetermined threshold value is the size (W×H) of the current block. When calculating the SAD between the prediction blocks, when even- or odd-numbered pixels in the vertical direction are excluded, the predetermined threshold is set to W×H»1 of the current block where W and H are respectively the width (horizontal size) and the height (vertical size) of the current block. For example, the predetermined threshold value may be 4W×H»1 of the current block. For example, the predetermined threshold value is defined according to Equation 9 in consideration of the bit depth of a luma component.

$$\text{shift} = \text{Max}(2, 14 - \text{Bit Depth Y}\_) \quad [\text{Equation 9}]$$
$$\text{Threshold} = (1 \ll \text{Bit Depth\_Y} - N + \text{shift})) \times \text{width of current block}$$
$$(W) \times \text{height of the current block}(H)$$

Here, N is any number in a range of from 8 to 13. When calculating the SAD between the prediction blocks, when even- or odd-numbered pixels in the vertical direction are excluded, the vertical length of the current block is equal to H»1.

When the size of the current block is equal to or larger than a predetermined size, the encoder or the decoder divides the current block into sub-blocks having a smaller size and performs motion vector refinement while regarding as the sub-block as the current block.

For example, when the width or the height of the current block is greater than 16, the current block is divided into 16×16-size sub-blocks and motion vector refinement is performed on a per sub-block basis.

When the motion vector refinement is performed on a per sub-block basis, the number of sub-blocks is determined depending on at least one of the coding parameters of the current block.

For example, the number of sub-blocks varies depending on the size of the current block. When the size of the current block is 32×32, the number of sub-blocks is 16 while when the size of the current block is 64×64, the number of sub-blocks is 4.

For example, the number of sub-blocks varies depending on the type of the current block. When the type of the current block is a non-square type having a size of 16×32 where the vertical size is larger than the horizontal size, the number of sub-blocks is 8. On the other hand, when the type of the current block is a square type having a size of 32×32, the number of sub-blocks is 16.

In addition, when the motion information refinement method is performed on a sub-block basis, the shape of the sub-block is determined as a square regardless of the shape of the current block.

When the motion information refinement is performed on a sub-block basis, the shape of a sub-block is determined to be the same as the shape of the current block.

For example, when the current block has a non-square shape whose vertical size is larger than the horizontal size, the shape of the sub-block is determined as a non-square shape whose vertical size is larger than the horizontal size.

In the case where the motion vector refinement can be performed on a sub-block basis, the sub-block-based motion vector refinement execution information is determined according to on the information signaled via a bitstream. Herein, the sub-block-based motion vector refinement execution information is signaled for one or more units selected from among a video, a sequence, a picture, a slice, a tile group, a tile, a coding tree unit, an encoding unit, a prediction unit, a conversion unit and a block. The sub-block-based motion vector refinement execution information indicates whether the sub-block-based motion information refinement is performed for the corresponding unit.

In addition, the sub-block-based motion information refinement is performed motion information of sub-blocks having the determined magnitude by using at least one of the sub-block-based motion information prediction methods.

Here, the prediction blocks are located within a predetermined search range centered on the pixel position indicated by the initial motion vector. A prediction block may be generated from a motion vector derived in a predetermined search range and a motion vector that minimizes a difference between prediction blocks may be determined as a refined motion vector. For example, the search range is determined to be 4 pixels for each of the horizontal and vertical directions.

Alternatively, the search range may be set to a range of from −2 integer pixels to +2 integer pixels with respect to the pixel position indicated by the initial motion vector.

The difference between the prediction blocks means a difference between multiple prediction blocks generated on the basis of an L0 initial motion vector for an L0 direction or an L1 initial motion vector for an L1 direction or a difference between prediction blocks generated on the basis of the L0 initial motion vector and the L1 initial motion vector, respectively.

The encoder or the decoder determines, as a refined motion vector, a motion vector indicating a reconstructed sample position in a reference picture, which exhibits the smallest distortion when reconstructed samples in the reference picture and bi-direction prediction samples are compared by using a distortion calculation method such as a sum of absolute differences (SAD), a sum of absolute transformed differences (SATD), a sum of squared errors (SSE), a mean of squared errors, and a mean-removed SAD. In this case, the distortion is calculated for at least one of the luma component and the chroma component.

For example, as illustrated in FIG. 36, the encoder or the decoder finds a case where the least error occurs between a prediction block P0 generated by using a motion vector that has moved in a predetermined search range having a predetermined distance from a reference pixel position in an L0 reference picture indicated by an L0 initial motion vector and a prediction block P1 generated by using an L1 motion vector derived from the L0 motion vector, and the motion vector that has moved within the predetermined search range as a refined L0 motion vector.

Here, a L1 refined motion vector is a motion vector derived by mirroring or scaling the L0 refined motion vector. Alternatively, the L1 refined motion vector is a motion vector obtained by mirroring or scaling a difference between the L0 initial motion vector and the L0 motion vector that has moved within the predetermined search range in the L0 direction and adding the difference to the L1 initial motion vector.

The L0 motion vector is a motion vector obtained by adding a difference between the L0 initial motion vector and the L0 motion vector that has moved within the predetermined search range to the L0 initial motion vector. Similarly, the L1 motion vector is a motion vector obtained by adding a difference between the L1 initial motion vector and the L1 motion vector that has moved within the predetermined search range to the L1 initial motion vector. Here, the difference between the initial motion vector and the moved motion vector within the predetermined search range means the refinement motion vector that is described above.

On the other hand, when a POC difference between a reference picture for the L0 direction and an encoding/decoding target picture differs from a POC difference between a reference picture for the L1 direction and the encoding/decoding target picture, L0 motion vector or the difference between the L0 initial motion vector and the moved L0 motion vector within the predetermined search range is not mirrored but is scaled and the value resulting from the scaling is used to derive the L1 motion vector.

When a POC difference between an encoding/decoding target picture and a reference picture for the L0 direction differs from a POC difference between the encoding/decoding target picture and a reference picture for the L1 direction, the L0 motion vector or the difference between the L0 initial motion vector and the moved L0 motion vector within a predetermined search range is not mirrored but is scaled, and the resulting value of the scaling is used to drive the L1 motion vector.

When a POC difference between an encoding/decoding target picture and a reference picture for the L0 direction differs from a POC difference between the encoding/decoding target picture and a reference picture for the L1 direction, the L1 motion vector or the difference between the L1 initial motion vector and the moved L1 motion vector within a predetermined search range is not mirrored but is scaled, and the resulting value of the scaling is used to drive the L0 motion vector.

Alternatively, as illustrated in FIG. 37, the encoder or the decoder finds a case where the least error occurs between a prediction block (P1) generated by using a motion vector that has moved in a predetermined search range having a predetermined distance from a reference pixel position in an L1 reference picture indicated by an L1 initial motion vector and a prediction block (P0) generated by using an L0 motion vector derived from the L1 motion vector, and determines the motion vector that has moved in the predetermined search range as a refined L1 motion vector.

Here, an L0 refined motion vector is a motion vector obtained by mirroring or scaling the L1 refined motion vector.

The L0 motion vector is a motion vector derived by mirroring or scaling in the L0 direction a difference between an L1 initial motion vector and a moved L1 motion vector within a predetermined search range and adding the resulting value of the mirroring or the scaling to the L0 initial motion vector.

Similarly, the encoder or the decoder finds a case where the least error occurs between a prediction block P0 generated by using a motion vector that has moved in a predetermined search range in a L0 reference picture indicated by an L0 initial motion vector and a prediction block P1 generated by using an L1 motion vector derived from an L0 motion vector, and the motion vector that has moved within the predetermined search range as a refined L0 motion vector.

On the other hand, when a POC difference between an encoding/decoding target picture and a reference picture for the L0 direction differs from a POC difference between the encoding/decoding target picture and a reference picture for the L1 direction, the encoder or the decoder does not mirror but scales the L1 motion vector or the difference between the L1 initial motion vector and the moved L1 motion vector within the predetermined search range and uses the resulting value of the scaling to derive the L0 motion vector.

On the other hand, when deriving a Ly direction motion vector from a Lx motion vector, at least one of a reference picture indicated by the Lx motion vector, a picture to which the current block belongs, and a time distance (or POC difference) between reference pictures in a Ly direction is considered. Here, x and y may be different positive integers including zero.

As to the mirroring, for example, the encoder or the decoder mirrors an L0 motion vector with respect to a reference picture in an L1 reference picture list, which has a POC difference the same as the POC difference between a reference picture indicated by the L0 motion vector and the picture to which the current block belongs, and the mirrored motion vector as an L1 direction motion vector.

As to the scaling, for example, the encoder or the decoder scales an L0 motion vector by considering a POC difference with a picture having the least POC difference with the picture to which the current block belongs, excluding a reference picture having the same POC difference as a reference picture indicated by an L0 motion vector among the reference pictures in an L1 reference picture list, and the scaled L0 motion vector is derived as the L1 direction motion vector.

On the other hand, when refining a motion vector on the basis of a difference between prediction blocks, a motion vector value to be mirrored or scaled is selected according to the encoding/decoding information. That is, the motion vector value to be subjected to the mirroring or the scaling is selected among the initial motion vector, the motion vector moved in the predetermined search range, and the difference between the initial motion vector and the moved motion vector, according to the encoding/decoding information.

For example, when the current block is a bi-directionally predictable block and there is only L0 initial motion vector, a motion vector obtained by mirroring or scaling in the L1 direction the L0 initial motion vector or a moved L0 motion vector within a predetermined search range is used as an L1 motion vector.

When current block has bi-directional prediction information and both of the first and second POC difference values ((POC_ref0-POC_curr and POC_ref1-POC_curr) have negative values in which the first POC difference value is a POC difference between an encoding/decoding target picture and a first reference picture corresponding to a first direction (for example, L0 direction) and the second POC difference value is a POC difference between the encoding/decoding target picture and a second reference picture corresponding to a second direction (for example, L1 direction), a motion vector obtained by mirroring or scaling in the L1 direction the L0 initial motion vector or the moved L0 motion vector within a predetermined search range is moved as an L1 motion vector. A difference between the L1 initial motion vector and the moved L1 motion vector within a predetermined search range is added to the L0 initial motion vector, and the resulting value is used as the L0 motion vector.

In addition, for example, when the current block has bi-directional motion information and only either one of the first and second POC difference values ((POC_ref0-POC_curr and POC_ref1-POC_curr) has a negative value in which the first POC difference value is a POC difference between an encoding/decoding target picture and a first reference picture corresponding to a first direction (for example, L0 direction) and the second POC difference value is a POC difference between the encoding/decoding target picture and a second reference picture corresponding to a second direction (for example, L1 direction), a difference between the L0 initial motion vector and the moved L0 motion vector within a predetermined search region is mirrored or scaled in the L1 direction, and the resulting value is added to the L1 initial motion vector to obtain a value that is to be used as the L1 motion vector. Alternatively, the difference between the L1 initial motion vector and the moved L1 motion vector within a predetermined search region is mirrored or scaled in the L0 direction, and the resulting value is added to the L0 initial motion vector to obtain the L0 motion vector.

When performing motion refinement using prediction blocks (hereinafter, referred to as prediction block-based motion refinement), the encoder or the decoder calculates the weighted sum of a prediction block generated by using the L0 initial motion vector and a prediction block generated by using the L1 initial motion vector to produce a block which is to be used for motion refinement.

The refined motion vector of the prediction block-based motion refinement is used only for motion compensation and temporal motion vector prediction.

When refining a motion vector using prediction blocks of the current block (bi-lateral template matching), it is possible to refine a motion at the decoder side without transmitting an addition context element.

The prediction block-based motion vector refinement (bi-lateral template matching) is performed when the current block has no relationship with a uni-direction prediction merge candidate, local illumination compensation mode, affine motion compensation mode, sub-CU merge mode.

For example, as illustrated in FIG. 38, the encoder or the decoder calculates the weighted sum of a prediction block P0 generated by using the L0 initial motion vector and a prediction block P1 generated by using the L1 initial motion vector and uses the resulting prediction block Ps as a template. The encoder or the decoder generates a prediction block Pr0 by moving the motion vector in a predetermined search range centered on a pixel position indicated by the L0 initial motion vector. A motion vector that produces the least error between the prediction block Pr0 and the template Ps is determined as a refined motion vector for the L0 list.

The encoder or the decoder generates a prediction block Pr1 by moving the motion vector in a predetermined search region centered on a pixel position indicated by the L1 motion vector. A motion vector that produces the least error between the prediction block Pr1 and the template Ps is determined as a refined motion vector for the L1 list.

On the other hand, a prediction block Ps is calculated according to Equation 10.

$$Ps = (a1*P0 + a2*P1) \gg 1 \quad \text{[Equation 10]}$$

Here, a1 and a2 are weights used in a weight function. The weight is not limited to a fixed value but it may be a variable value. The weights applied to the respective prediction blocks are equal to each other or different from each other. To use variable weights, information of a weight for a decoding target block is signaled via a bitstream.

When only the L0 initial motion vector is derived, a prediction block P0 generated by using the L0 initial motion vector is determined as a template. In addition, a motion vector that produces the least error between the template and the prediction block Pr0 generated by a moved motion vector in a predetermined search region centered on a pixel position indicated by the L0 initial motion vector is determined as a refined motion vector for the L0 list direction.

When calculating the difference between prediction blocks of the current block, at least one of the distortion value and the cost value for the motion vector is taken into account.

For example, when the L0 initial motion vector is used to generate prediction blocks P0 and P1, the cost value is calculated according to Equation 11.

$$\text{Cost value} = \text{distortion value (prediction block } (P0) - \text{prediction block } (P1)) + (\text{initial } L0 \text{ motion vector} - \text{refined } L0 \text{ motion vector})*\text{weight} \quad \text{[Equation 11]}$$

For example, when the prediction blocks P0 and P1 are generated by using the L1 initial motion vector, the cost value is calculated according to Equation 12.

$$\text{Cost value} = \text{distortion value (prediction block } (P0) - \text{prediction block } (P1)) + (\text{initial } L1 \text{ motion vector} - \text{refined } L1 \text{ motion vector})*\text{weight} \quad \text{[Equation 12]}$$

Here, weight represents a negative value greater than zero or a positive value less than zero.

In the calculation of the cost value, the distortion value is calculated using at least one of SAD, SATD, and MR-SAD of prediction blocks.

The encoder or the decoder searches for a new motion vector nMV that produces the least error between prediction blocks within a predetermined search range centered on a pixel position indicated by the refined motion vector rMV that is found on the basis of the initial motion vector.

Here, when an error between the prediction blocks P0 and P1 obtained by using the new motion vector nMV is larger than an error between the prediction blocks P0 and P1 obtained by using the refined motion vector rMV, the encoder or the decoder stops performing the motion vector refinement. However, when the error between the prediction blocks P0 and P1 obtained by using the new motion vector nMV is smaller than the error between the prediction block P0 and P1 generated by using the refined motion vector rMV, the encoder or the decoder continues searching for a new motion vector in a predetermined search range centered on a pixel position indicated by the new motion vector mMV.

When the error between the prediction blocks obtained by using the motion vector is smaller than the error between the prediction blocks obtained by using the refined motion vector, the encoder or the decoder continues searching for a new motion vector. In this case, the number of the searches for a new motion vector is limited by the motion refinement execution frequency information which means the number of times that motion refinement is performed.

For example, when the motion refinement execution frequency information has a value of 2, the number of times that a new vector is searched for is limited to two. The motion refinement execution frequency information is inserted into a bitstream so as to be signaled. As the motion refinement execution frequency, a predetermined value present in the encoder and the decoder may be used.

As having been described, there are two motion vector refinement methods based on an initial motion vector: one is a method of using templates and the other is a method of using prediction blocs.

The encoder or the decoder selects a motion vector refinement method according to motion vector refinement mode information (MV_REFINE_MODE) indicating the motion vector refinement method.

For example, the motion vector refinement mode information (MV_REFINE_MODE) has a first value of 0, the motion vector refinement is performed by using neighboring templates of the current block. However, when the motion vector refinement mode information (MV_REFINE_MODE) has a second value of 1, the motion vector prediction is performed by using prediction blocks generated on the basis of the motion vector. Here, the first value and the second may can be oppositely set. That is, the first value and the second value may be set to 1 and 0, respectively.

The motion vector refinement mode information is inserted into a bitstream so as to be signaled.

In addition, the motion vector refinement method may be adaptively determined according to the coding parameters.

For example, the initial motion vector of the current block has a uni-direction motion vector, neighboring templates are used to correct the initial motion vector. When the initial motion vector of the current block is a bi-direction vector, the motion vector refinement is performed by using prediction block signals obtained by using the motion vector.

In another example, only the L0 or L1 motion vector is available in the current block, the motion vector refinement is performed by using the neighboring templates. On the other hand, when both of the L0 and L1 motion vectors are available in the current block, the weighted sum (prediction block) of the prediction blocks generated by using the motion vectors is used as the template, and the motion vector refinement for each prediction direction is performed by using the template.

In a further example, only the L0 or L1 motion vector is available in the current block, the motion vector refinement is performed with neighboring templates. When both of the L0 and L1 motion vectors are available in the current block, the motion vector refinement for each prediction direction is performed by using a difference between prediction blocks generated by using the motion vectors of the respective prediction directions, respectively.

When deriving a motion vector for the current block, the initial motion vector itself can be used as the motion vector of the current block without performing the motion vector refinement on the initial motion vector.

Next, a method of deriving a refined motion vector for each sub-block will be described in detail. Here, the term "sub-block" has the same meaning as the block described above.

Figure 39:
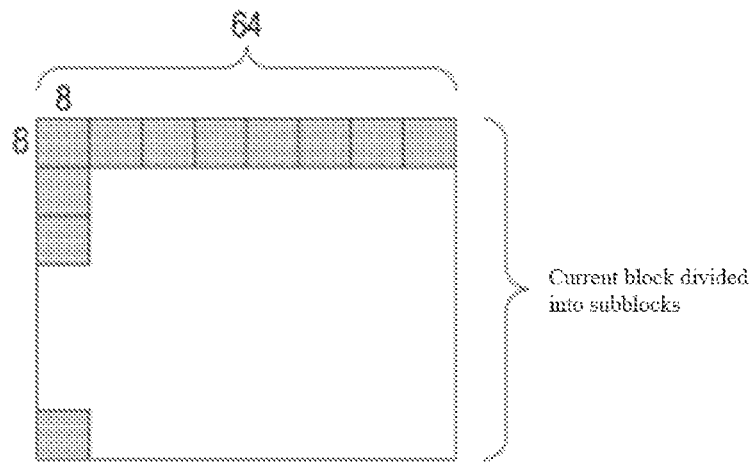
FIGS. 39 and 40 are diagrams illustrating sub-blocks into which a current block can be divided.
Figure 40:
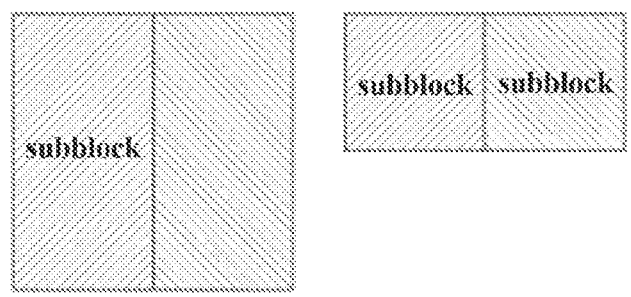
Figure 41:
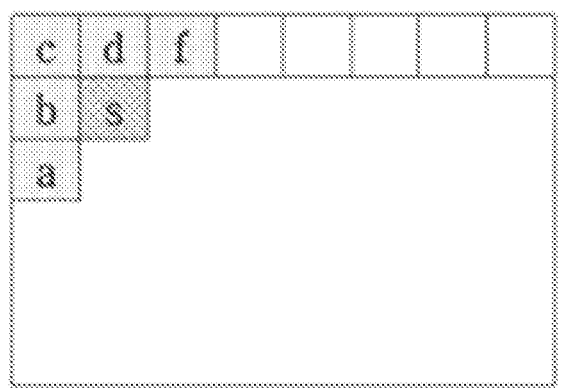
FIG. 41 is a diagram illustrating a method of setting an initial motion vector used for refinement of a motion vector on a per sub-block basis.

FIG. 39 and FIG. 40 are diagrams illustrating sub-blocks generated by dividing a current block, and FIG. 41 is a diagram illustrating a method of setting an initial motion vector to be used for motion vector refinement per sub-block.

The current block can be divided into one or more sub-blocks.

For example, the current block can be divided into N sub-blocks in the horizontal direction and M sub-blocks in the vertical direction. That is, the current block can be divided into M*N sub-blocks where M and N are each an integer value equal to or greater than 1 and M and N are the same integer or different integers.

Alternatively, the current block may be divided into W*H sub-blocks in which there are W pixels in the horizontal direction and H pixel in the vertical direction. Here, W and H are each an integer equal to or greater than 2, and W and H are the same integer or different integers.

The size of the sub-blocks is determined depending on the size of the current block. For example, when the size of the current block is K samples or less, 4×4-size sub-blocks are used. When the size of the current block is larger than N samples, 8×8-size sub-blocks are used. Here, K is a positive integer, for example, 256.

The size of the sub-blocks may be a size predefined in the encoder and the decoder. The size of the sub-blocks is determined on the basis of sub-block size information. The sub-block size information is inserted into a bitstream so as to be signaled.

When determining the size of the sub-blocks, the sub-block size information and the current block size information are both considered.

For example, when the sub-block size information indicates the depth of the sub-block, the size of the sub-block is determined according to Equation 13 using the width/length of the current block and the depth of the sub-block.

$$\text{Sub-block size} = (\text{average length of vertical length and horizontal length of current block} \gg \text{sub-block depth information}) \quad \text{[Equation 13]}$$

For example, as illustrated in FIG. 39, the average value of the horizontal length and the vertical length of the current block is 64 and the sub-block depth information has a value of 3, the size of the sub-blocks is set to 8.

The sub-blocks have a square shape or a rectangular shape.

For example, as illustrated in FIG. 40, when the current block has a square shape, the sub-blocks may have a rectangular shape. When the current block has a rectangular shape, the sub-blocks may have a square shape.

In addition, the encoder or the decoder sets an initial motion vector to be used for the sub-block-based motion vector refinement according to at least one method described below.

(1) An initial motion vector determined for a current block or a refined motion vector thereof is set as an initial motion vector a sub-block. That is, the encoder or the decoder sets the derived initial motion vector of the current block as the initial motion vector of each sub-block within the current block. For example, when the initial motion vector of the current block is mv0, and the current block is divided into sub-blocks s1 to s4, the encoder or the decoder determines the initial motion vector mv0 of the current block as the initial motion vector of each of the sub-blocks s1 to s4.

(2) A zero motion vector (0,0) is set as the initial motion vector for each sub-block.

(3) A motion vector derived from a reconstructed block in a collocated picture having a temporal neighboring block of the sub-block is set as the initial motion vector for each sub-block.

(4) A motion vector derived by sub-block-based merging is set as the initial value of the initial motion vector for each sub-block.

(5) A motion vector of a sub-block adjacent to a current sub-block is set as the initial motion vector for the current sub-block. For example, as illustrated in FIG. 41, the motion vector of a left sub-block b, a lower left sub-block a, an upper left sub-block d, or an upper right sub-block adjacent to a current sub-block is used as the initial motion vector of the current sub-block.

Among sub-block-based initial motion vectors set by any one of the methods (1) to (5), only the initial motion vector having the same reference picture index information as the motion information that is determined on a per block basis can be used as the initial motion vector for the sub-block.

When it is not identical to the reference picture index information of the motion information determined on a per block basis, a value obtained by scaling based on a time distance is used as the initial motion vector for the current sub-block.

When obtaining the initial motion vector to be used for sub-block-based motion vector refinement, the reference picture index information of the sub-blocks is set to a predetermined value. For example, the reference picture index information of all of the sub-blocks is set to zero.

Accordingly, when the reference picture index information of the motion information derived on a per block basis or the motion information derived from a neighboring block does not have a value of 0, a value obtained by scaling based on a time distance is used as the initial motion vector of the sub-block.

The encoder or the decoder performs motion vector refinement on a per sub-block basis by using the derived initial motion vector.

The encoder or the decoder ⊨ current block corrects the initial motion vector of a sub-block by using information on a spatial neighboring block and/or a temporal neighboring block and one of the template-based motion vector refinement method and the prediction block-based motion vector prediction method.

The merge mode-based motion vector refinement utilization information (flag), template size information, search area information, weight information, motion refinement execution frequency information, motion vector refinement mode information, and sub-block size information that is likely to be used in the motion vector refinement described above may be included in the motion compensation information.

When the current block uses AMVP mode instead of merge mode, and there is at least one motion vector estimation candidate, the encoder or the decoder derives a refined motion vector by using a generated motion vector estimation candidate list.

For example, at least one of a motion vector of a reconstructed neighboring block, a motion vector of a col-located block and a motion vector of a block adjacent to the collocated block is determined as a motion vector estimation candidate to be included in a motion vector estimation candidate list, the encoder or the decoder uses the generated motion vector estimation candidate as the initial motion vector, and a refined motion vector can be derived from the determined initial motion vector through the motion vector refinement method.

When there are N motion vector candidates, the encoder or the decoder uses a motion vector candidate that produces the least difference between a template in a reference picture and a neighboring template of an encoding/decoding target block is used as the refined motion vector.

When there are N motion vector estimation candidates, the encoder or the decoder uses a motion vector estimation candidate that produces the least matching cost for matching a template in a reference picture and a neighboring template of an encoding/decoding target block as the initial motion vector to be used to obtain a refined motion vector.

When there are N motion vector estimation candidates, the encoder or the decoder sets each of the N motion vector estimation candidates as the initial motion vectors, derives refined motion vectors corresponding to the respective initial motion vectors by using the template-based motion vector refinement method, and sets a refined motion vector of a motion vector estimation candidate having the least matching cost as a final refined motion vector.

When there are N motion vector estimation candidates, the encoder or the decoder sets only the n-th motion vector estimation candidate as the initial motion vector, and derives a refined motion vector by performing the template-based motion vector refinement method on the n-th motion vector estimation candidate (i.e., initial motion vector). In this case, n is an integer greater than 0 and not greater than N.

For example, there are two motion vector estimation candidates, the encoder or the decoder sets only the first motion vector estimation candidate as the initial motion vector and derives a refined motion vector by performing the template-based motion vector refinement method on the initial motion vector.

When using a refined motion vector candidate, when the refined motion vector candidate has a different motion vector value from the first motion vector candidate in a motion vector candidate list, the encoder or the decoder uses the determined refined motion vector candidate as the first candidate in the motion vector candidate list. In this case, all of the existing motion vector candidates in the list are position-shafted or the N-th existing candidate in the list is eliminated.

When only one of a motion vector of a reconstructed neighboring block, a motion vector of a collocated block, and a motion vector estimation candidate determined from a motion vector of a block adjacent to the collocated block exists, the encoder or the decoder sets the motion vector estimation candidate as the initial motion vector and performs the template-based motion vector refinement method on the initial motion vector to derive a refined motion vector.

When using a refined motion vector candidate that is finally determined, when it has a refined motion vector value which is different from that of the first motion vector estimation candidate in the motion vector candidate list, the encoder or the decoder uses the refined motion vector candidate as the second candidate in the motion vector candidate list. When constructing a candidate list and a motion vector estimation candidate list, when spatial/temporal candidate blocks are encoded/decoded through the motion refinement method, the candidates are not inserted into the lists.

When constructing a merge candidate list and a motion vector prediction candidate list, when spatial/temporal candidate blocks are encoded/decoded by using the prediction block-based motion vector refinement method, the encoder or the decoder inserts the original initial motion vectors that are not refined into the corresponding candidate lists instead of refined motion vectors.

When constructing a merge candidate list and a motion vector estimation candidate list, when spatial/temporal candidate blocks are encoded/decoded by using the prediction block-based motion vector refinement method and the horizontal size and the vertical size of the spatial/temporal candidate blocks and the horizontal size and the vertical size of the current encoding/decoding target block are equal, the encoder or the decoder inserts the original initial motion vectors that are not refined into the corresponding lists instead of refined motion vectors.

When constructing a merge candidate list and a motion vector prediction candidate list, when spatial candidate blocks are encoded/decoded by using the prediction block-based motion vector refinement method and are included in the same region as the current encoding/decoding target block, the encoder or the decoder inserts the original initial motion vectors that are not refined into the corresponding lists instead of refined motion vectors.

Whether or not a current encoding/decoding target block and a neighboring block are included in the same region is determined by examining whether values (Cx/grid_size, Cy/grid_size) of an x component and a y component of an upper left pixel position of the current target block, which are divided by a predetermined size value (grid_size), are respectively equal to values (Nx/grid_size, Ny/grid_size) of an x component and a y component of an upper left pixel position of the neighboring block, which are divided by a predetermined size value (grid_size). That is, it is determined according to whether or not the condition that Cx/grid_size=Nx/grid_size and Cy/grid_size=Ny/grid_size is satisfied. When the former values are equal to the latter values, respectively, the encoder or the decoder determines that the encoding/decoding target block and the neighboring block are present within the same region.

In this case, the predetermined size value is an integer value greater than 0. The predetermined size value is a value present in the encoder and the decoder, a value that is entropy-encoded/decoded on a per CTU, CT, PU, or block basis, or a value that is entropy-encoded/decoded at a higher level such as a video parameter set, a sequence parameter set, a picture parameter set, an adaptation parameter set, a tile group header, or a slice header.

When constructing advanced temporal motion vector prediction information on a per sub-block basis, the position of a block corresponding to the current block in a current collocated picture is derived from motion vectors of spatial merge candidates of the current block. The collocated picture of the current picture is the same picture used to derive a temporal merge candidate and is entropy-encoded/decoded at a higher level such as a video parameter set, a sequence parameter set, a picture parameter set, an adaptation parameter set, a tile group header, or a slice header.

For example, as illustrated in FIG. 7, blocks indicating the same picture as the collocated picture are searched for in order of positions of spatial merge candidates A1, B1, B0, A0, and B2, and the position of a block corresponding to the current block is derived from the motion vector of the block. For example, referring to an example illustrated in FIG. 7, when a reference picture indicated by the block A1 is the same as the collocated picture, a block indicated by the motion vector of the block A1 block within the collocated picture is derives as a corresponding block used to construct a sub-block-based temporal motion vector of the current block.

When deriving the position of the corresponding block in the collocated picture, when the motion vector of a spatial merge candidate block of the current block is a refined motion vector, the encoder or the decoder derives the position of the corresponding block in the collocated picture by using the initial motion vector that is not refined. In addition, when deriving the position of a corresponding block in a collocated picture, when the current block and the spatial merge candidate block are located in the same CTU and the motion vector of the spatial merge candidate is a refined motion vector, the encoder or the decoder derives the position of the corresponding block in the collocated picture by using the initial motion vector that is not refined.

When deriving the position of a corresponding block in a collocated picture, when the current block and a spatial merge candidate block are located in difference CTUs and the motion vector of the spatial merge candidate is a refined motion vector, the encoder or the decoder derives the position of the corresponding block in the collocated picture by using the refined motion vector.

When deriving the position of a corresponding block in a collocated picture, when the current block and a spatial merge candidate block are located in different CTUs and the spatial merge candidate block is located at the left boundary of the CTU to which the current block belongs and has a refined motion vector, the encoder or the decoder derives the position of the corresponding block in the collocated picture by using the initial motion vector that is not refined.

When deriving the position of a corresponding block in a collocated picture, when the current block and a spatial merge candidate block are located in difference CTUs and the spatial merge candidate block is located at the top boundary of a CTU to which the current block belongs and has a refined motion vector, the encoder or the decoder derives the position of the corresponding block in the collocated picture by using the refined motion vector.

The encoder or the decoder inserts information on the current block used during the encoding/decoding process or information on the current block generated after the current block is encoded/decoded into a candidate list. The block information refers to at least one of the coding parameters, such as intra prediction mode, motion vector, and the like.

Unlike a conventional candidate list that is constructed on a per block basis, the candidate list in the present invention is maintained during the encoding/decoding process which is performed for each picture, slice, tile, CTU, CTU row, or CTU column and can be used in a specific unit such as a picture, slice, tile, CTU, CTU row, or CTU column during the encoding/decoding process, and is used on a per picture, slice, tile, CTU, CTU row, or CTU column basis. That is, blocks included in a specific unit (for example, a picture, slice, tile, tile group, CTU, CTU row, or CTU column) share the same candidate list.

The candidate list includes at least one piece of information on a block that is encoded/decoded prior to the current block on a per picture, slice, tile group, CTU, CTU row, or CTU column basis. The candidate list includes at least one piece of block information on a previously encoded/decoded picture, slice, tile, tile group, CTU, CTU row, or CTU column. When motion information of the current block is inserted into the candidate list, the refined motion vector generated through the motion information refinement method is not inserted and the initial motion vector is inserted.

The inserting of the information on the current block into a candidate list means that both of the refined motion vector generated by the motion information refinement method and the initial motion vector are inserted into the candidate list.

In addition, overlapped block motion compensation (OMBC), bi-directional optical (BIO) flow-based motion refinement method, generalized bi-prediction, weight prediction, and the like are not applied to the block that is encoded/decoded by using the motion refinement method.

In addition, local illumination compensation information on a block that is encoded/decoded by using a motion refinement method is derived from merge index information or a candidate block corresponding to merge index information.

Figure 42:
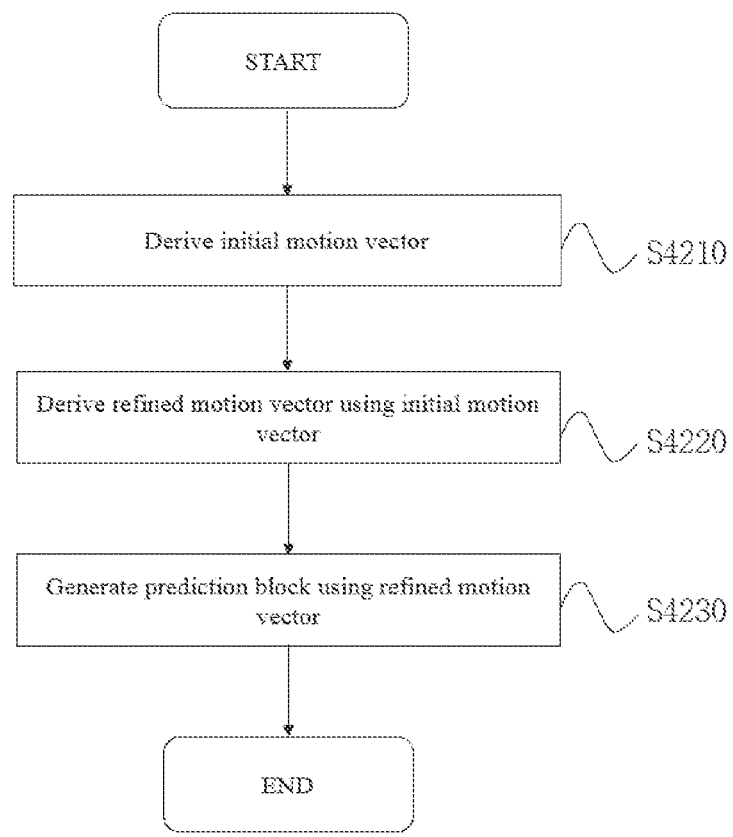
FIG. 42 is a flowchart illustrating an image decoding method according to an embodiment of the present invention.

FIG. 42 is a flowchart illustrating an image decoding method according to an embodiment of the present invention.

Referring to FIG. 42, an image decoding method according to an embodiment of the present invention includes a step of deriving an initial motion vector (S4210), a step of deriving a refined motion vector by using the initial motion vector (S4220) and/or a step of generating a prediction block by using the refined motion vector (S4230).

The decoder derives an initial motion vector from a merge candidate list of the current block (S4210).

In step S4210, the decoder derives an initial motion vector from a merge candidate indicated by merge index information included among merge candidates in a merge candidate list.

On the other hand, when the current block is a bi-directional prediction block and a merge candidate indicated by the merge index information has motion information for only one prediction direction, the motion vector of the existing motion information is mirrored or scaled to derive an initial motion vector (non-existing motion information) corresponding to the other prediction direction. Regarding this, since a detailed description has been given above with reference to FIG. 14, a redundant description will be avoided.

The decoder derives a refined motion vector by using the initial motion vector (S4220).

Specifically, in the step of deriving the refined motion vector (S4220), the initial motion vector is refined by a merge mode-based motion vector refinement method, a prediction block-based motion vector refinement method, or both.

In the step of deriving the refined motion vector (S4220), the refined motion vector is derived from at least one prediction block indicated by the initial motion vector.

Here, when the current block is a bi-directional prediction block, the decoder sets the weighted sum of a first prediction block indicated by a first prediction direction initial motion vector and a second prediction block indicated by a second prediction direction initial motion vector as a template, sets a search area in at least one reference picture indicated by at least one of the first prediction-direction initial motion vector and the second prediction-direction initial motion vector, and derives a motion vector indicating a third prediction block exhibiting the least difference with the template in the search area, as the refined motion vector.

Here, when a first search area indicated by the first prediction-direction initial motion vector and a second search area indicated by the second prediction-direction initial motion vector are set, the decoder derives the refined motion vector by using motion vectors indicating respective prediction blocks exhibiting the least difference with the templates in the first search area and the second search area.

On the other hand, when either the first prediction-direction initial motion vector or the second prediction-direction initial motion vector does not exist, the decoder derives an initial motion vector that does not exist by mirroring or scaling an existing initial motion vector.

Next, the decoder generates a prediction block of the current block by using the refined motion vector (S4230).

In the image decoding method described above, the current block may be a sub-block of a current block to be decoded. In this case, the decoder corrects the motion vector in units of sub-blocks.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

When a motion vector having at least one of a 16-pel unit, an 8-pel unit, a 4-pel unit, an integer-pel unit, $\frac{1}{8}$-pel unit, $\frac{1}{16}$-pel unit, $\frac{1}{32}$-pel unit and $\frac{1}{64}$-pel unit, the above embodiments of the present invention can also be applied. The motion vector may be selectively used for each pixel unit.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:
1. An image decoding method comprising:
constructing a merge candidate list of a current block;
deriving an initial motion vector of the current block based on the merge candidate list of the current block;
deriving a refinement motion vector of the current block;
deriving a final motion vector of the current block based on the initial motion vector and the refinement motion vector; and
obtaining prediction samples of the current block based on the final motion vector,
wherein the initial motion vector comprises an L0 initial motion vector and an L1 initial motion vector, and the refinement motion vector comprises an L0 refinement motion vector and an L1 refinement motion vector, and
wherein in response to a POC (picture order count) difference value between an L0 reference picture of the current block and a current picture including the current block being different from a POC difference value between an L1 reference picture of the current block and the current picture, one of the L0 refinement motion vector and the L1 refinement motion vector is derived by scaling the other.

2. The method according to claim 1, wherein the method further comprises obtaining information on the refinement motion vector, and
wherein the information on refinement motion vector magnitude index information, and refinement motion vector direction index information.

3. The method according to claim 2, wherein a magnitude of the refinement motion vector is derived based on by performing shift operation to a value indicated by the refinement motion vector magnitude index information.

4. The method according to claim 3, wherein the refinement motion vector magnitude index information indicates one of candidate values pre-defined in a decoder.

5. The method according to claim 1, wherein the method further comprises decoding a motion vector flag indicating one of two merge candidates in the merge candidate list, and
wherein in response to that motion vector refinement being performed in the current block, a merge index of the current block is inferred to be equal to a value indicated by the initial motion vector flag information.

6. The method according to claim 1, wherein the final motion vector is derived by summing the initial motion vector and the refinement motion vector.

7. The method according to claim 1, wherein in response to the POC difference value between the L0 reference picture of the current block and the current picture being greater than the POC difference value between the L1 reference picture of the current block and the current picture, the L1 refinement motion vector is derived by scaling the L0 refinement motion vector.

8. The method according to claim 1, wherein in response to that the POC difference value between the L0 reference picture and the current picture being less than the POC difference value between the L1 reference picture and the current picture, the L0 refinement motion vector is derived by scaling the L1 refinement motion vector.

9. An image encoding method comprising:
constructing a merge candidate list of a current block;
deriving an initial motion vector of the current block based on the merge candidate list of the current block;
deriving a refinement motion vector of the current block;
deriving a final motion vector of the current block based on the initial motion vector and the refinement motion vector; and
obtaining prediction samples of the current block based on the final motion vector, wherein the initial motion vector comprises an L0 initial motion vector and an L1 initial motion vector, and the refinement motion vector comprises an L0 refinement motion vector and an L1 refinement motion vector, and wherein in response to a POC (picture order count) difference value between an L0 reference picture of the current block and a current picture including the current block being different from a POC difference value between an L1 reference picture of the current block and the current picture, one of the L0 refinement motion vector and the L1 refinement motion vector is derived by scaling the other.

10. A bitstream transmitting method, the method comprising:

generating a bitstream by encoding video data based on an image encoding method; and transmitting the generated bitstream, wherein the image encoding method comprising:

constructing a merge candidate list of a current block;

deriving an initial motion vector of the current block based on the merge candidate list of the current block;

deriving a refinement motion vector of the current block;

deriving a final motion vector of the current block based on the initial motion vector and the refinement motion vector; and obtaining prediction samples of the current block based on the final motion vector, wherein the initial motion vector comprises an L0 initial motion vector and an L1 initial motion vector, and the refinement motion vector comprises an L0 refinement motion vector and an L1 refinement motion vector, and wherein in response to a POC (picture order count) difference value between an L0 reference picture of the current block and a current picture including the current block being different from a POC difference value between an L1 reference picture of the current block and the current picture, one of the L0 refinement motion vector and the L1 refinement motion vector is derived by scaling the other.

* * * * *